US012743623B2

(12) United States Patent
Hashimoto et al.

(10) Patent No.: US 12,743,623 B2
(45) Date of Patent: Sep. 22, 2026

(54) INFORMATION PROCESSING DEVICE AND MACHINE LEARNING METHOD THAT OPTIMIZE A DECODING PROCESS USING BACK-PROPAGATION

(71) Applicants: OMRON CORPORATION, Kyoto (JP); KYOTO UNIVERSITY, Kyoto (JP)

(72) Inventors: Atsushi Hashimoto, Tokyo (JP); Yoshitaka Ushiku, Tokyo (JP); Shinsuke Mori, Kyoto (JP); Taichi Nishimura, Kyoto (JP)

(73) Assignees: OMRON CORPORATION, Kyoto (JP); KYOTO UNIVERSITY, Kyoto (JP)

( * ) Notice: Subject to any disclaimer, the term of this patent is extended or adjusted under 35 U.S.C. 154(b) by 805 days.

(21) Appl. No.: 17/802,620

(22) PCT Filed: Feb. 19, 2021

(86) PCT No.: PCT/JP2021/006302
§ 371 (c)(1),
(2) Date: Aug. 26, 2022

(87) PCT Pub. No.: WO2021/177056
PCT Pub. Date: Sep. 10, 2021

(65) Prior Publication Data
US 2023/0013870 A1 Jan. 19, 2023

(30) Foreign Application Priority Data
Mar. 6, 2020 (JP) ................................ 2020-038785

(51) Int. Cl.
*G06N 3/082* (2023.01)
*G06N 3/04* (2023.01)

(52) U.S. Cl.
CPC ............... *G06N 3/082* (2013.01); *G06N 3/04* (2013.01)

(58) Field of Classification Search
CPC .......... G06N 3/082; G06N 3/04; G06N 3/042; G06N 3/0442; G06N 3/047; G06N 3/0475;
(Continued)

(56) References Cited

FOREIGN PATENT DOCUMENTS

| CN | 108132968 A | 6/2018 |
|---|---|---|
| CN | 109117795 A | 1/2019 |

(Continued)

OTHER PUBLICATIONS

Wang, W., Ooi, B., et al., “Effective Multi-Modal Retrieval based on Stacked Auto-Encoders”, Apr. 2014, Proceedings of the VLDB Endowment, vol. 7, Issue 8, pp. 649-660 (Year: 2014).*

(Continued)

*Primary Examiner* — Jennifer N Welch
*Assistant Examiner* — Vijay M Balakrishnan
(74) *Attorney, Agent, or Firm* — Sughrue Mion, PLLC

(57) ABSTRACT

Accuracy of a model extracting a graph structure as an intermediate representation from input data is improved. An encoding unit extracts a feature amount of each of a plurality of vertices included in a graph structure from input data, and calculates a likelihood that an edge is connected to the vertex. A sampling unit determines the graph structure based on a conversion result of a Gumbel-Softmax function for the likelihood. A learning unit optimizes a decoding unit and the encoding unit by back propagation using a loss function including an error between output data generated from the graph structure and correct data.

6 Claims, 20 Drawing Sheets

(58) Field of Classification Search
CPC ...... G06N 3/094; G06N 3/084; G06N 3/0895; G06N 3/0455
See application file for complete search history.

(56) References Cited

FOREIGN PATENT DOCUMENTS

| | | | |
|---|---|---|---|
| CN | 109359733 | A | 2/2019 |
| CN | 110188168 | A | 8/2019 |
| CN | 110309268 | A | 10/2019 |
| CN | 110490035 | A | 11/2019 |
| WO | 2019/081781 | A1 | 5/2019 |

OTHER PUBLICATIONS

Chandar, S. et al., “Correlational Neural Networks”, Oct. 12, 2015, arXiv:1504.07225 (Year: 2015).*

Pan, S. et al., “Learning Graph Embeddings with Adversarial Training Methods”, Jul. 29, 2019, arXiv:1901.01250v2 (Year: 2019).*

Liu, P. et al., “Learning Digital Geographies through a Graph-Based Semi-supervised Approach”, Sep. 2019, GeoComputation 2019, 10.17608/k6.auckland.9848213 (Year: 2019).*

Boehmke, B., and Greenwell, B., “Chapter 19 Autoencoders”, https://bradleyboehmke.github.io/HOML/autoencoders.html, archived Nov. 17, 2019 at the Wayback Machine (Year: 2019).*

Figurnov, M. et al., “Implicit Reparameterization Gradients”, 2018, 32nd Conference on Neural Information Processing Systems (NeurIPS 2018), 12 pages (Year: 2018).*

Angelopoulos, A. et al., “Tackling Faults in the Industry 4.0 Era—A Survey of Machine-Learning Solutions and Key Aspects”, Dec. 23, 2019, Sensors, vol. 20 No. 109, doi: 10.3390/s20010109, 34 pages (Year: 2019).*

Martinez-Garcia, Miguel et al., “Visually Interpretable Profile Extraction with an Autoencoder for Health Monitoring of Industrial Systems”, Jul. 2019, 2019 IEEE 4th International Conference on Advanced Robotics and Mechatronics (ICARM), 6 pages (Year: 2019).*

Chinese Office Action dated Feb. 25, 2025 in Application No. 202180015456.3.

Thomas Kipf, et al. “Neural Relational Inference for Interacting Systems”, arXiv:1802.04687v1 [stat.ML], Feb. 13, 2018, (17 pages).

Chen Wang, et al. “SAG-VAE: End-to-end Joint Inference of Data Representations and Feature Relations”, arXiv:1911.11984v1 [cs. LG], Nov. 27, 2019, pp. 1-15 (15 pages).

Extended European Search Report dated Feb. 21, 2024 in Application No. 21764535.7.

Pengcheng Yin et al., “STRUCTVAE: Tree-structured Latent Variable Models for Semi-supervised Semantic Parsing”, Proceedings of the 56th Annual Meeting of the Association for Computational Linguistics (vol. 1: Long Papers), (https://www.aclweb.org/anthology/P18-1070/), Jul. 15-20, 2018, pp. 754-765.

Eric Jang et al., “Categorical Reparameterization With Gumbel-Softmax”, https://openreview.net/forum?id=rkE3y85ee, ICLR (International Conference on Learning Representations) 2017, 12 pages.

Jianlong Chang et al., “Differentiable Architecture Search with Ensemble Gumbel-Softmax”, https://arxiv.org/abs/1905.01786, May 6, 2019, 11 pages.

Kai Sheng Tai et al., “Improved Semantic Representations From Tree-Structured Long Short-Term Memory Networks”, https://www.aclweb.org/anthology/P15-1150/, Proceedings of the 53rd Annual Meeting of the Association for Computational Linguistics and the 7th International Joint Conference on Natural Language Processing (vol. 1: Long Papers), pp. 1556-1566.

Chen Wang et al., “SAG-VAE: End-to-end Joint Inference of Data Representations and Feature Relations”, arXiv:1911.11984v2, [online], arXiv (Cornell university), Feb. 20, 2020, Version v2, pp. 1-15, [retrieved on Apr. 8, 2011], retrieved from the Internet: <https://arxiv.org/abs/1911.119B4v2>.

Mengyuan Chen et al., “Inference for Network Structure and Dynamics from Time Series Data via Graph Neural Network”, arXiv:2001.06576v1, [online], arXiv (Cornell University), Jan. 18, 2020, version v1, pp. 1-10, [retrieved on Apr. 8, 2021], retrieved from the Internet: <https://arxiv.org/abs/2001,06576v1>.

International Search Report for PCT/JP2021/006302, dated Apr. 27, 2021.

Written Opinion for PCT/JP2021/006302, dated Apr. 27, 2021.

Lingbo Mo: “Research on Key technologies of Automatic Text Generation Based on Images”, china Excellence Master’s Thesis Full text Database, Issue 8, pp. 1-64, Aug. 15, 2019 (65 pages total).

Communication issued Nov. 5, 2024 in Chinese Application No. 202180015456.3.

Communication dated Nov. 17, 2025, issued in European application No. 21764535.7.

Martina Garofalo et al., “Leveraging Knowledge Graph Embedding Techniques for Industry 4.0 Use Cases”, Cornell University Library, Jul. 31, 2018 (17 pages).

* cited by examiner 10
11
Im1
Im2
Im3
Im4
12
Tx1 TOMATO
Tx2 PUMPKIN
Tx3 MAYONNAISE
Tx4 KETCHUP
100
110
111
IMAGE ENCODER
V
TO DECODING UNIT
112
biLSTM
113
biLSTM
Θ
Φ
114
MATRIX ESTIMATOR
Y
120
121
DISPERSION REPRESENTER
122
LSTM
G
123
biLSTM
max
Ω
Γ
124
MATRIX ESTIMATOR
X
130
SAMPLING UNIT
Tr Tx1
Tx2
Tx3
Tx4
121
DISPERSION REPRESENTER
122
LSTM
123
biLSTM
γ1
γ2
γ3
γ4
X
Im1
Im2
Im3
Im4
ω1
ω2
ω3
ω4

| | $Nd_1$ | $Nd_2$ | $Nd_3$ | $Nd_4$ |
|---|---|---|---|---|
| $Lf_1$ | 1 ($Br_1$) | 0 | 0 | 0 |
| $Lf_2$ | 0 | 1 ($Br_2$) | 0 | 0 |
| $Lf_3$ | 0 | 0 | 0 | 1 ($Br_3$) |
| $Lf_4$ | 0 | 0 | 0 | 1 ($Br_4$) |

Y1

| | $Nd_1$ | $Nd_2$ | $Nd_3$ | $Nd_4$ |
|---|---|---|---|---|
| $Nd_1$ | 0 | 0 | 1 ($Br_5$) | 0 |
| $Nd_2$ | 0 | 0 | 1 ($Br_6$) | 0 |
| $Nd_3$ | 0 | 0 | 0 | 1 ($Br_7$) |
| $Nd_4$ | 0 | 0 | 0 | 0 |

130
SAMPLING UNIT
Tr
140
141
LSTM
h1 v1
h2 v2
h3 v3
h4 v4
142
ENCODER DECODER MODEL
143
SAMPLING UNIT
20
St1 CUT TOMATO INTO BITE-SIZED PIECES
St2 FRY PUMPKIN IN FRY PAN
St3 PUT PUMPKIN ON TOMATO
St4 ADD KETCHUP AND MAYONNAISE

20
St1
CUT TOMATO INTO BITE-SIZED PIECES
St2
FRY PUMPKIN IN FRY PAN
St3
PUT PUMPKIN ON TOMATO
St4
ADD KETCHUP AND MAYONNAISE
160
161
biLSTM
162
biLSTM
163
C
D
λ1
λ2
λ3
λ4
γ1
γ2
γ3
γ4
ω1
ω2
ω3
ω4

| | $Cm_1$ | $Cm_2$ | $Cm_3$ | $Cm_4$ | $Cm_5$ |
|---|---|---|---|---|---|
| $Us_1$ | 0 | 1 ($Rs_1$) | 0 | 0 | 0 |
| $Us_2$ | 0 | 0 | 0 | 1 ($Rs_2$) | 0 |
| $Us_3$ | 0 | 0 | 1 ($Rs_3$) | 0 | 0 |
| $Us_4$ | 0 | 0 | 0 | 0 | 1 ($Rs_4$) |

301~305
310
320
326
324
322
318
312
314
316
315
COMMUNICATION INTERFACE
PROCESSOR
BUS CONTROLLER
MEMORY
SENSOR
IO MODULE

| | $Vx_1$ | $Vx_2$ | $Vx_3$ |
|---|---|---|---|
| $Vx_1$ | 0 | 1 ($Eg_1$) | 0 |
| $Vx_2$ | 0 | 0 | 1 ($Eg_2$) |
| $Vx_3$ | 0 | 1 ($Eg_3$) | 0 |

INFORMATION PROCESSING DEVICE AND MACHINE LEARNING METHOD THAT OPTIMIZE A DECODING PROCESS USING BACK-PROPAGATION

CROSS REFERENCE TO RELATED APPLICATIONS

This application is a National Stage of International Application No. PCT/JP2021/006302 filed Feb. 19, 2021, claiming priority based on Japanese Patent Application No. 2020-038785 filed Mar. 6, 2020, the contents of each of which being herein incorporated by reference in their entireties.

TECHNICAL FIELD

The present disclosure relates to an information processing device and a machine learning method.

BACKGROUND ART

Conventionally, a configuration in which a relationship between elements included in input data is extracted as a graph structure to perform post-processing using the graph structure as an intermediate expression is known. For example, NPL 1 discloses a configuration in which a syntax tree is generated by a reward increment nonnegative factor offset reinforcement characteristic eligibility (REINFORCE) algorithm and data structured by the syntax tree is reconfigured by a variational autoencoder (VAE) as the intermediate expression.

CITATION LIST

Non Patent Literatures

NPL 1: Pengcheng Yin, Chunting Zhou, Junxian He, Graham Neubig, "StructVAE: Tree-structured Latent Variable Models for Semi-supervised Semantic Parsing" (https://www.aclweb.org/anthology/P18-1070/), in Proceedings of the 56th Annual Meeting of the Association for Computational Linguistics (Volume 1: Long Papers), pp. 754-765.

NPL 2: Eric Jang, Shixiang Gu, Ben Poole, "Categorical Reparameterization with Gumbel-Softmax", https://openreview.net/forum?id=rkE3y85ee, ICLR (International Conference on Learning Representations) 2017.

NPL 3: Jianlong Chang, Xinbang Zhang, Yiwen Guo, Gaofeng Meng, Shiming Xiang, Chunhong Pan, "Differentiable Architecture Search with Ensemble Gumbel-Softmax", https://arxiv.org/abs/1905.01786.

NPL 4: Kai Sheng Tai, Richard Socher, Christopher D. Manning, "Improved Semantic Representations From Tree-Structured Long Short-Term Memory Networks", https://www.aclweb.org/anthology/P15-1150/, in Proceedings of the 53rd Annual Meeting of the Association for Computational Linguistics and the 7th International Joint Conference on Natural Language Processing (Volume 1: Long Papers), pp. 1556-1566.

SUMMARY OF INVENTION

Technical Problem

In reinforcement learning including the REINFORCE algorithm used in NPL 1, because a model (agent) of an optimization target advances optimization of a parameter while trial and error are repeated, sometimes it is difficult to specify a correct answer for the output of the model. Accordingly, in the reinforcement learning, it is known that sometimes it is difficult to improve the accuracy of the model as compared with machine learning using back propagation that differentiates a loss function that defines an error between output from the model and a correct answer to propagate the error from an output layer to an input layer of the model based on a chain law. In the configuration disclosed in NPL 1, there is room for improvement in accuracy of a learned model formed by the machine learning.

The present disclosure has been made to solve the above problems, and an object of the present disclosure is to improve accuracy of the model that extracts a graph structure as the intermediate representation from input data.

Solution to Problem

An information processing device according to an example of the present disclosure extracts a graph structure representing a correlation between elements included in input data from the input data to generate output data from the graph structure. The information processing device includes an encoding unit, a sampling unit, a decoding unit, and a learning unit. The encoding unit extracts a feature amount of each of a plurality of vertices included in the graph structure from the input data to calculate a likelihood that an edge representing the correlation is connected to the vertex. The sampling unit determines the graph structure based on a conversion result of a Gumbel-Softmax function for the likelihood. The decoding unit receives the graph structure and the feature amount to generate the output data. The learning unit optimizes the decoding unit and the encoding unit by back propagation that targets a loss function for minimization, the loss function including an error between the output data and correct data.

According to this disclosure, the loss function can also be differentiated by the determination processing for the graph structure by the sampling unit, so that the error between the output data and the correct data can be back-propagated from the output layer of the decoding unit to the input layer of the encoding unit by the back propagation. As a result, the optimization of the decoding unit and the encoding unit can be performed end-to-end from the output layer of the decoding unit to the input layer of the encoding unit, so that the accuracy of the graph structure as the intermediate representation and the accuracy of the output data can be improved.

In the above disclosure, the information processing device may further include a reconfiguration unit configured to reconfigure the graph structure from the output data. The loss function may include an error between an output from the reconfiguration unit and a correct graph structure.

According to this disclosure, the machine learning is performed such that the identity is maintained between the graph structure reconfigured by the reconfiguration unit and the correct graph structure, whereby lossless compression by the encoding unit is promoted. As a result, the accuracy of the graph structure as the intermediate representation and the accuracy of the output data can be further improved as compared with the configuration 1.

In the above disclosure, the information processing device may further include an inference unit configured to receive the graph structure from the sampling unit to output an inference result for the input data. The learning unit performs unsupervised learning for the decoding unit and the encoding unit, and performs supervised learning for the inference unit.

According to this disclosure, the lossless compression by the encoding unit is promoted, and inference accuracy of the inference unit can be improved by supervised learning for the inference unit.

In the above disclosure, the input data may include first data and second data. Modality of the first data may be different from modality of the second data. The encoding unit may include a first encoder and a second encoder. The first encoder may extract a feature amount of the first data. The second encoder may extract a feature amount of the second data.

According to this disclosure, the graph structure can be extracted from various input data.

In the above disclosure, modality of the output data may be different from modality of the input data.

According to this disclosure, various data can be generated from the graph structure.

A machine learning method according to another example of the present disclosure is performed by a processor that executes a machine learning program stored in a storage unit for a model that extracts a graph structure representing a correlation between elements included in input data from the input data to generate output data from the graph structure. The machine learning method includes: extracting a feature amount of each of a plurality of vertices included in the graph structure from the input data to calculate a likelihood that an edge representing the correlation is connected to the vertex; determining the graph structure based on a conversion result of a Gumbel-Softmax function for the likelihood; receiving the graph structure and the feature amount to generate the output data; and optimizing the model by back propagation that targets a loss function for minimization, the loss function including an error between the output data and correct data.

According to this disclosure, the loss function can be also differentiated by determining the graph structure, so that the error between the output data and the correct data can be back-propagated from the output layer of the model to the input layer of the model by the back propagation. As a result, the optimization of the model can be performed end-to-end from the output layer of the model to the input layer of the model, so that the accuracy of the graph structure as the intermediate representation and the accuracy of the output data can be improved.

Advantageous Effects of Invention

According to the information processing device and the machine learning method of the present disclosure, the accuracy of the model that extracts the graph structure as the intermediate representation from the input data can be improved.

BRIEF DESCRIPTION OF DRAWINGS

FIG. 6 is a view illustrating the adjacent matrix representing the tree structure in FIG. 5.

FIG. 13 is a view illustrating a matrix representing the two-graph structure in FIG. 12.

FIG. 21 is a view illustrating matrix representation corresponding to the directed graph structure in FIG. 20.

DESCRIPTION OF EMBODIMENTS

Figure 1:
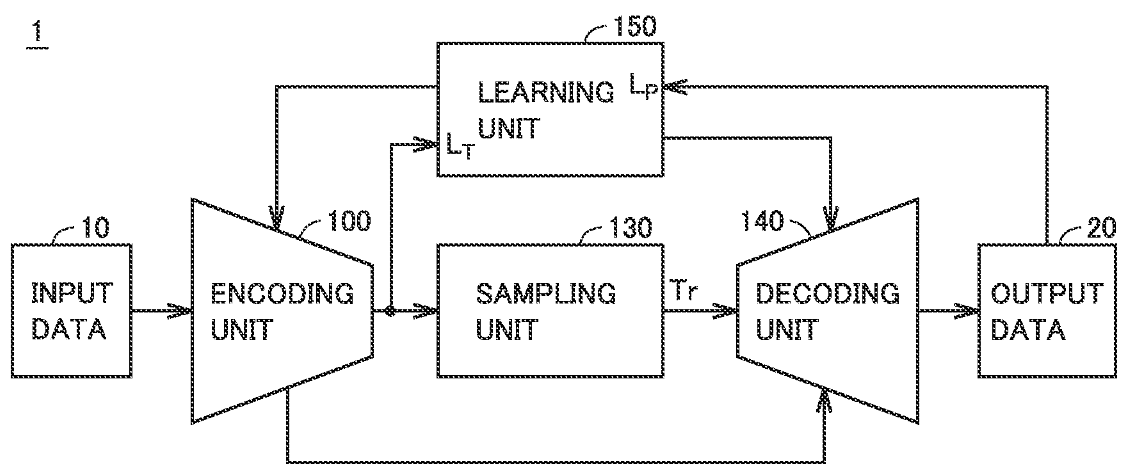
FIG. 1 is a block diagram illustrating a configuration of an information processing device according to a first embodiment.

Hereinafter, embodiments of the present invention will be described in detail with reference to the drawings. In the drawings, the same or corresponding portion is denoted by the same reference numeral, and the description thereof will not generally be repeated.

Application Example

First Embodiment

FIG. 1 is a block diagram illustrating a configuration of an information processing device 1 according to a first embodiment. As illustrated in FIG. 1, information processing device 1 includes an encoding unit 100, a sampling unit 130, a decoding unit 140, and a learning unit 150. Information processing device 1 extracts a graph structure representing a correlation between elements included in input data 10 from input data 10, and generates output data 20 from the graph structure. The case where the output data including procedure sequence data of food is generated from input data including image column data and foodstuff column data of a cooking procedure will be described in the first embodiment.

Figure 2:
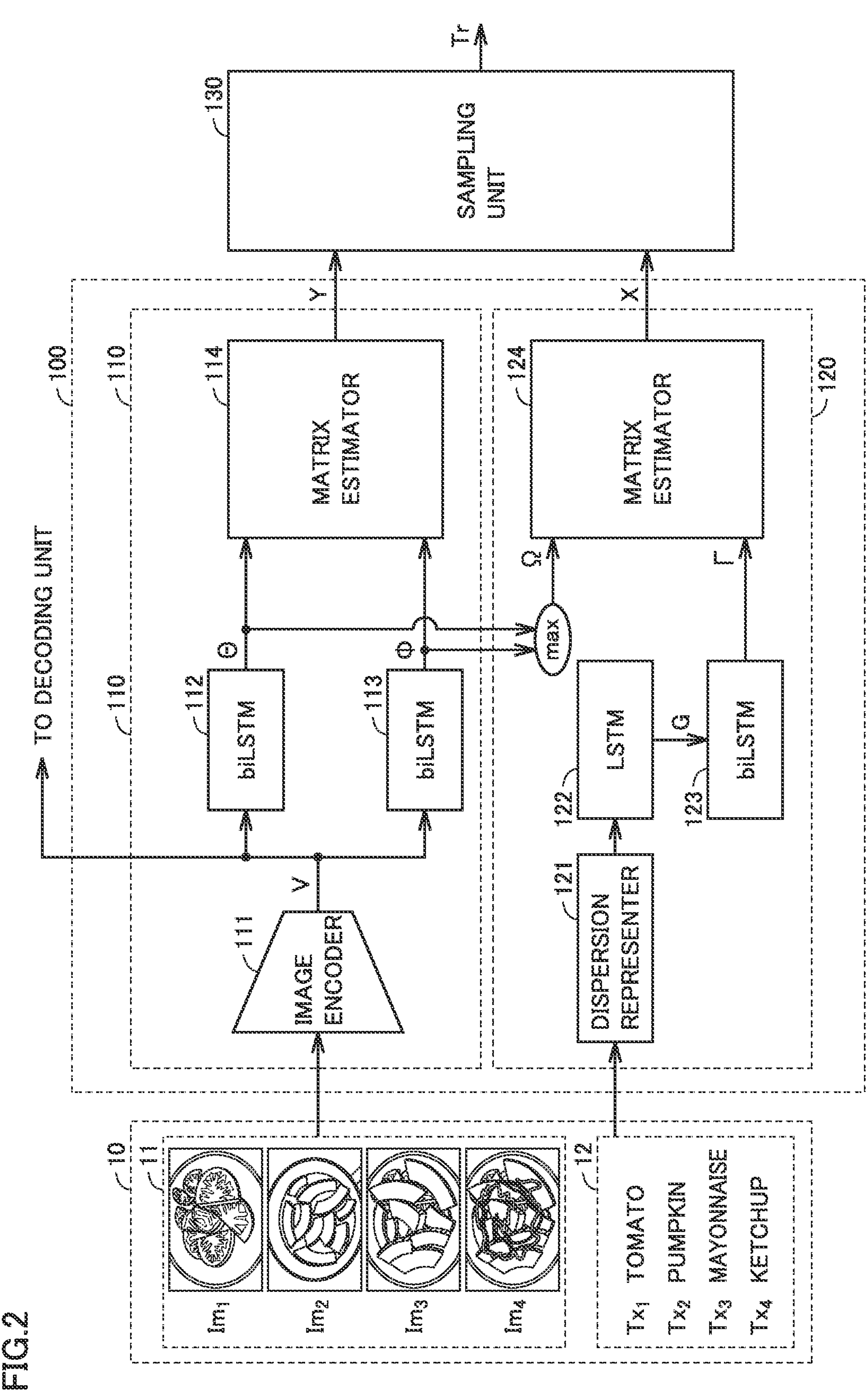
FIG. 2 is a block diagram illustrating specific configurations of input data and an encoding unit in FIG. 1.

FIG. 2 is a block diagram illustrating specific configurations of input data 10 and encoding unit 100 in FIG. 1. As illustrated in FIG. 2, input data 10 includes image column data 11 (first data) and foodstuff column data 12 (second data). Modality of image column data 11 is an image. Modality of foodstuff column data 12 is a character string. The modality of image column data 11 is different from the modality of foodstuff column data 12. The modality includes a format, a type, or a type of data.

Image column data 11 includes images $Im_1$ to $Im_M$. Each of images $Im_1$to $Im_M$ represents the image of each procedure of the cooking, and the cooking is performed in order of the images $Im_1$ to $Im_M$. That is, images $Im_1$ to $Im_M$ are ordered in this order. Foodstuff column data 12 includes character strings $Tx_1$ to $Tx_N$. Each of character strings $Tx_1$ to $Tx_N$ represents a foodstuff name. In the process of the cooking, character strings $Tx_1$ to $Tx_N$ are used in this order. That is, character strings $Tx_1$ to $Tx_N$ are ordered in this order. FIG. 2 illustrates the case where a number of procedures M is four and a number of foodstuffs N is four. Character strings Tx1 to Tx4 represent "tomato", "pumpkin", "mayonnaise", and "ketchup", respectively. The number of procedures M is not limited to four, but may be less than or equal to three or greater than or equal to five. The same applies to the number of foodstuffs N. In addition, the number of procedures M and the number of foodstuffs N may be different.

Encoding unit 100 includes an encoder 110 (first encoder) and an encoder 120 (second encoder). Encoder 110 includes a learned image encoder 111, a bidirectional long short-term memory (biLSTM) 112, 113 and a matrix estimator 114. Encoder 120 includes a dispersion representer 121, an LSTM 122, a biLSTM 123, and a matrix estimator 124. For example, dispersion representer 121 includes word2vec.

Image encoder 111 extracts a feature vector vk of image Imk included in image column data 11, and outputs a vector representation $V=(v_1, v_2, \ldots, v_k, \ldots, V_M)$ (feature amount). biLSTM 112 receives vector representation V and outputs a vector representation $\Theta=(\theta_1, \theta_2, \ldots, v_k, \ldots, \theta_M)$ (feature amount). Feature vectors $\theta_1$ to $\theta_M$ correspond to feature vectors $v_1$ to $v_M$, respectively. biLSTM 113 receives vector representation V and outputs a vector representation $\Theta=(\varphi_1, \varphi_2, \ldots, \varphi_k, \ldots, \varphi_M)$ (feature amount). Feature vectors $\varphi_1$ to $\varphi_M$ correspond to feature vectors $v_1$ to $v_M$, respectively. Index k is a natural number.

Matrix estimator 114 receives vector representations Θ, Φ, estimates the adjacent relation of images $Im_1$ to $Im_M$, and outputs the adjacent relation as an adjacent matrix Y. The estimation of the adjacent relation between images $Im_1$ to $Im_M$ means that likelihood that an edge exists between two vertices is calculated with each of images $Im_1$ to $Im_M$ as a vertex of a graph structure. A component $Y_{i,j}$ of adjacent matrix Y is expressed by the following equation (1).

Mathematical Formula 1

Mathematical formula 1

$$Y_{i,j} = \frac{\exp(\theta_i^T \varphi_j)}{\sum_{k=1}^{k=M} \exp(\theta_i^T \varphi_k)} \tag{1}$$

In encoder 120, a vector expression $\Omega=(\omega_1, \omega_2, \ldots, \omega_k, \ldots, \omega_M)$ (feature amount) is calculated from vector expressions Θ, Φ, and vector expression Ω is input to matrix estimator 124. The component of each dimension of feature vector ωk is the larger one of the components of the dimensions of feature vectors $\theta_k$, $\varphi_k$.

Dispersion representer 121 outputs a dispersion representation of character string $Tx_k$ included in foodstuff column data 12. LSTM 122 converts the dispersion representation of character string $Tx_k$ into a feature vector $g_k$ and outputs a vector representation $G=(g_1, g_2, \ldots, g_k, \ldots, g_N)$. biLSTM 123 receives vector representation G and outputs a vector representation $\Gamma=(\gamma_1, \gamma_2, \ldots, \gamma_k, \ldots, \gamma_N)$ (feature amount). Feature vectors $\gamma_1$ to $\gamma_N$ correspond to feature vectors $g_1$ to $g_N$, respectively.

Matrix estimator 124 receives vector representations Ω, Γ, estimates adjacent relationships between images $Im_1$ to $Im_M$ and character strings $Tx_1$ to $Tx_N$, and outputs the adjacent relationships as an adjacent matrix X. The estimation of the adjacent relation between images $Im_1$ to $Im_M$ and character strings $Tx_1$ to $Tx_N$ means that each of character strings $Tx_1$ to $Tx_N$ is set as the vertex of the graph structure and the likelihood that the edge exists between the vertex corresponding to each of character strings $Tx_1$ to $Tx_N$ and the vertex corresponding to each of images $Im_1$ to $Im_4$ is calculated. Component $X_{i,j}$ of adjacent matrix X is expressed by the following equation (2).

Mathematical Formula 2

Mathematical Formula 2

$$X_{i,j} = \frac{\exp(\gamma_i^T \omega_j)}{\sum_{k=1}^{k=M} \exp(\gamma_i^T \omega_k)} \tag{2}$$

Figure 3:
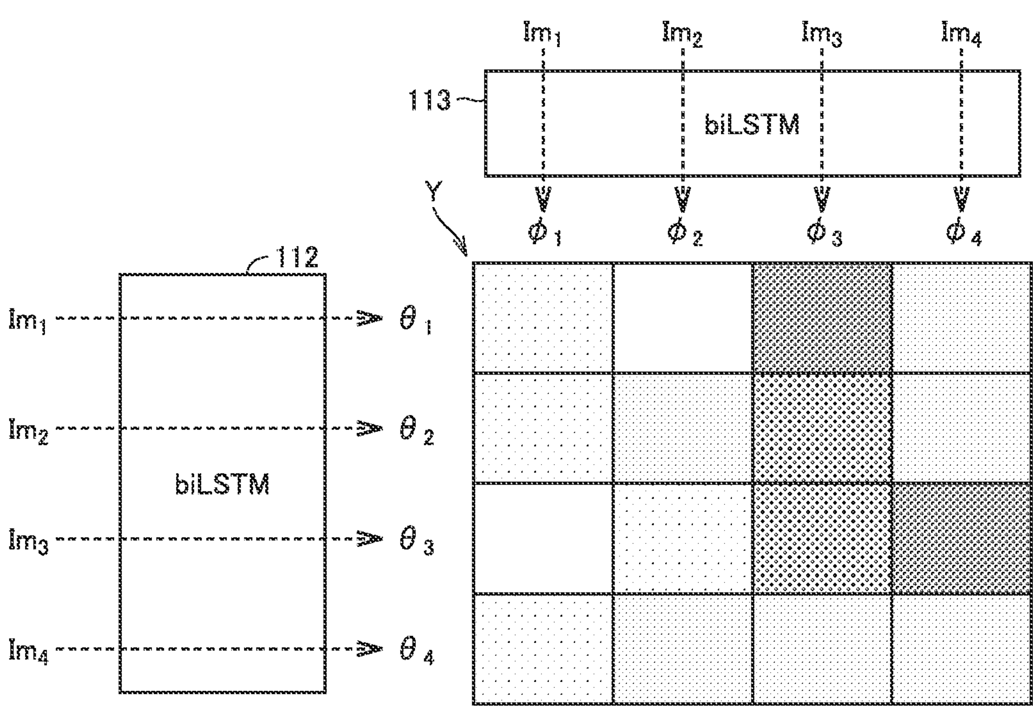
FIG. 3 is a schematic diagram illustrating an adjacent matrix output from a first encoder in FIG. 2.

FIG. 3 is a schematic diagram of adjacent matrix Y in FIG. 2. In FIG. 3, the darker the hatching applied to each component, the greater the likelihood of the component. In FIG. 3, the likelihood of existence of the edge from the vertex included in a row to a vertex included in a column is a component of the adjacent matrix specified by the row and the column. That is, adjacent matrix Y represents a directed graph structure. The likelihood of the existence of the edge from the vertex included in the column toward the vertex included in the row may be the component of the adjacent matrix specified by the row and the column.

Adjacent matrix Y representing the directed graph structure may be transformed into an adjacent matrix T representing an undirected graph structure as needed. In the transformation of adjacent matrix Y, for example, an average value of the respective components of adjacent matrix Y and the components obtained by inverting the rows and columns of the components can be set as the components of adjacent matrix T corresponding to the two components such that a transposed matrix of adjacent matrix T is equal to adjacent matrix T.

Figure 4:
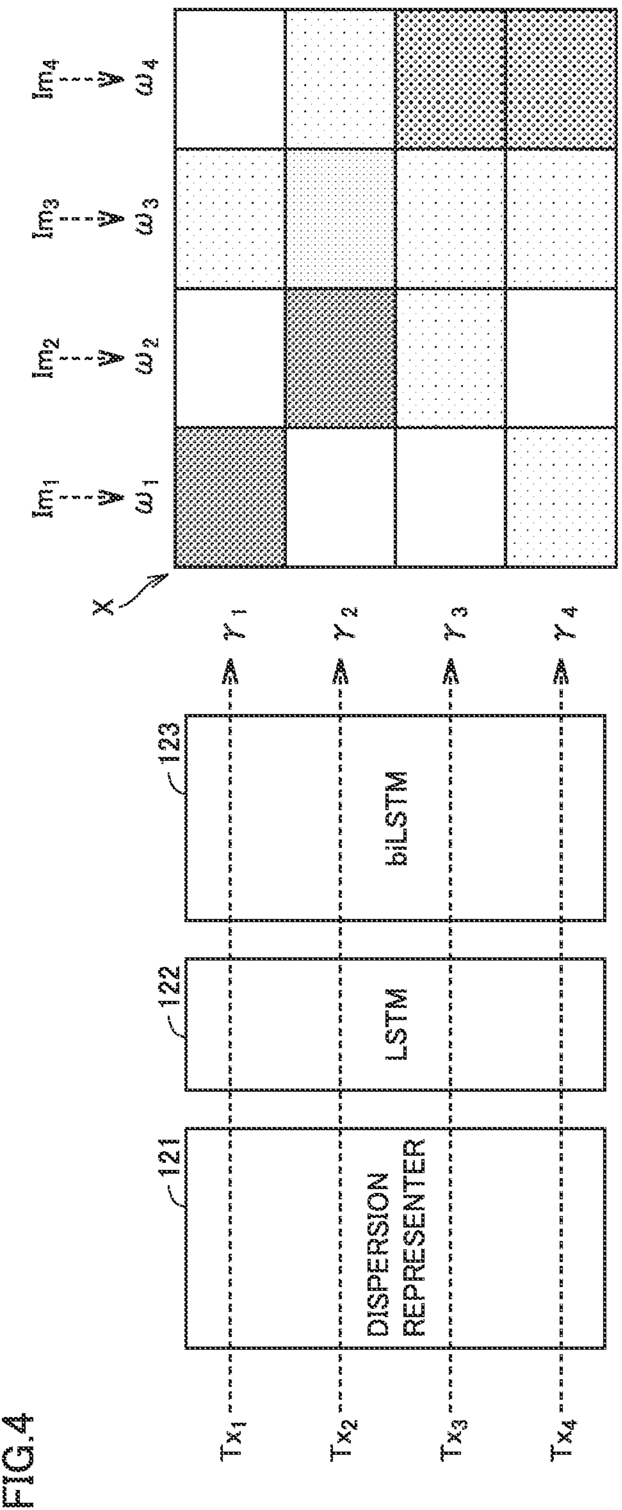
FIG. 4 is a schematic diagram illustrating the adjacent matrix output from a second encoder in FIG. 2.

FIG. 4 is a schematic diagram of adjacent matrix X in FIG. 2. The relationship between density of the hatching and the likelihood is similar to that in FIG. 3. In FIG. 4, the likelihood of whether the edge exists between the vertex included in the row and the vertex included in the column is the component of the adjacent matrix specified by the row and the column. Adjacent matrix X represents the undirected graph structure.

Referring to FIG. 2 again, sampling unit 130 receives adjacent matrices X, Y, and outputs a tree structure Tr (graph structure) in which the vertex corresponding to each of character strings $Tx_1$ to $Tx_N$ is set to a leaf node, the vertex corresponding to the last image in image column data 11 is set to a root node, and the vertex corresponding to another image is set to a node. Sampling unit 130 uses the Gumbel-Softmax function (see NPL 2) to convert the likelihood of each component of adjacent matrices X, Y into a probability that the edge exists between two vertices corresponding to the component (reparameterization trick). Sampling unit 130 converts adjacent matrices X, Y into adjacent matrices A, B, respectively, by the reparameterization trick. Components $A_{i,j}$, $B_{i,j}$ are expressed as the following equations (3), (4), respectively.

Mathematical Formula 3

Mathematical Formula 3

$$A_{i,j} = \frac{\exp\left[\{\log(X_{i,j}) + \delta_{i,j}\}/\tau\right]}{\sum_{k=1}^{k=M} \exp\left[\{\log(X_{i,k}) + \delta_{i,k}\}/\tau\right]} \tag{3}$$

$$B_{i,j} = \frac{\exp\left[\{\log(Y_{i,j}) + \varepsilon_{i,j}\}/\tau\right]}{\sum_{k=1}^{k=M} \exp\left[\{\log(Y_{i,k}) + \varepsilon_{i,k}\}/\tau\right]} \tag{4}$$

In the equations (3), (4), $\delta_{i,k}$, $\varepsilon_{i,k}$ are noises sampled from a gumbel (0,1) distribution. $\tau$ is a temperature parameter of the Gumbel-Softmax function. Sampling unit 130 determines the presence or absence of a branch (edge) between nodes using adjacent matrices A, B, and determines tree structure Tr.

Figure 5:
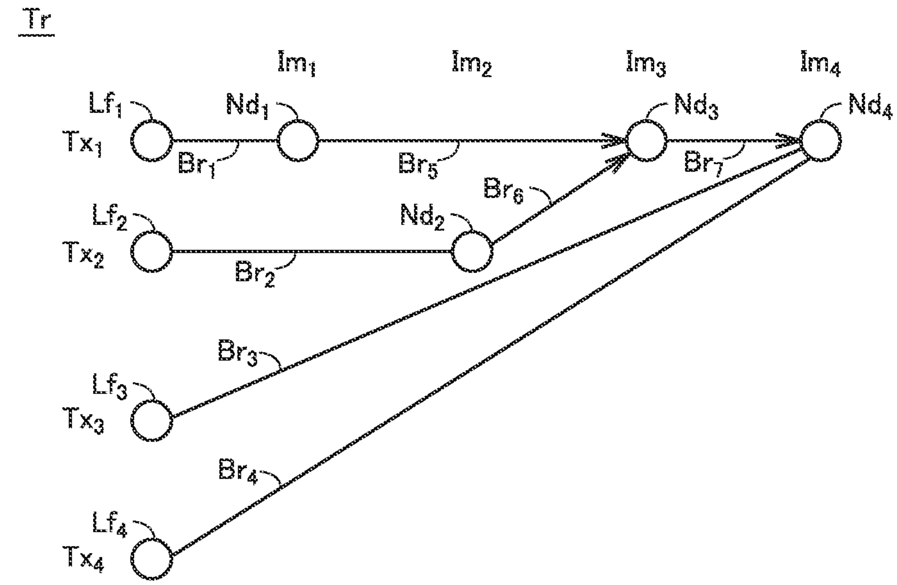
FIG. 5 is a view illustrating a tree structure in FIG. 1.

FIG. 5 is a view illustrating tree structure Tr in FIG. 1. In FIG. 5, nodes $Nd_1$ to $Nd_4$ correspond to images $Im_1$ to $Im_4$, respectively. Node $Nd_4$ is a root node. Leaf nodes $Lf_1$ to $Lf_4$ correspond to character strings $Tx_1$ to $Tx_4$, respectively.

As illustrated in FIG. 5, leaf node $Lf_1$ and node $Nd_1$ are connected by a branch $Br_1$. Leaf node $Lf_2$ and node $Nd_2$ are connected by a branch $Br_2$. Leaf node $Lf_3$ and root node $Nd_4$ are connected by a branch $Br_3$. Leaf node $Lf_4$ and root node $Nd_4$ are connected by a branch $Br_4$. Nodes $Nd_1$ and $Nd_3$ are connected by a branch $Br_5$ extending from node $Nd_1$ toward node $Nd_3$. Nodes $Nd_2$ and $Nd_3$ are connected by a branch $Br_6$ extending from node $Nd_2$ toward node $Nd_3$. Node $Nd_3$ and root node $Nd_4$ are connected by a branch $Br_7$ from node $Nd_3$ toward root node $Nd_4$.

Tree structure Tr indicates that the result of the procedure illustrated in image $Im_1$ and the result of the procedure illustrated in image $Im_2$ are used in the procedure illustrated in image $Im_3$, and that the result of the procedure illustrated in image $Im_3$ is used in the procedure illustrated in image $Im_4$. In addition, tree structure Tr indicates that the foodstuff of character string $Tx_1$ is used in the procedure illustrated in image $Im_1$, that the foodstuff of character string $Tx_2$ is used in the procedure illustrated in image $Im_2$, and that the foodstuff of each of character strings $Tx_3$, $Tx_4$ is used in the procedure illustrated in image $Im_4$.

FIG. 6 is a view illustrating adjacent matrixes X1, Y1 representing tree structure Tr in FIG. 5. Adjacent matrices X1, Y1 are determined by sampling unit 130 through adjacent matrices A, B, respectively. For example, sampling unit 130 sets the component corresponding to the maximum value in each row of adjacent matrices A, B to 1, sets other components to 0, and determines adjacent matrices X1, Y1 with each row as one-hot representation. When the maximum number of the edge output from the vertex or the maximum number of the edge entering the vertex included in the graph structure extracted from the input data is determined, each row or each column may be expressed as overlap of at least two one-hot expressions by ensemble Gumbel-Softmax (see NPL 3). In determining the graph structure, a characteristic of the extracted graph structure can be considered in addition to the conversion result of the reparameterization trick using the Gumbel-Softmax function for the likelihood of each component of adjacent matrices X, Y. For example, because the edge (self-loop) from a certain node to the node is not allowed in tree structure Tr indicating the cooking procedure, a diagonal component of adjacent matrix Y1 becomes 0. In addition, because the node higher in the hierarchy than the root node does not exist in tree structure Tr, each component of the fourth row corresponding to the root node in adjacent matrix Y1 becomes 0.

Adjacent matrix Y1 representing the directed graph structure may be converted into adjacent matrix T1 representing the undirected graph structure as needed. In the conversion of adjacent matrix Y1, for example, a maximum value, a minimum value, or a value randomly selected from among the components of adjacent matrix Y1 and the components obtained by reversing the rows and columns of the components can be set as the components of adjacent matrix T1 corresponding to the two components such that the transposed matrix of adjacent matrix T1 is equal to adjacent matrix T1.

Figure 7:
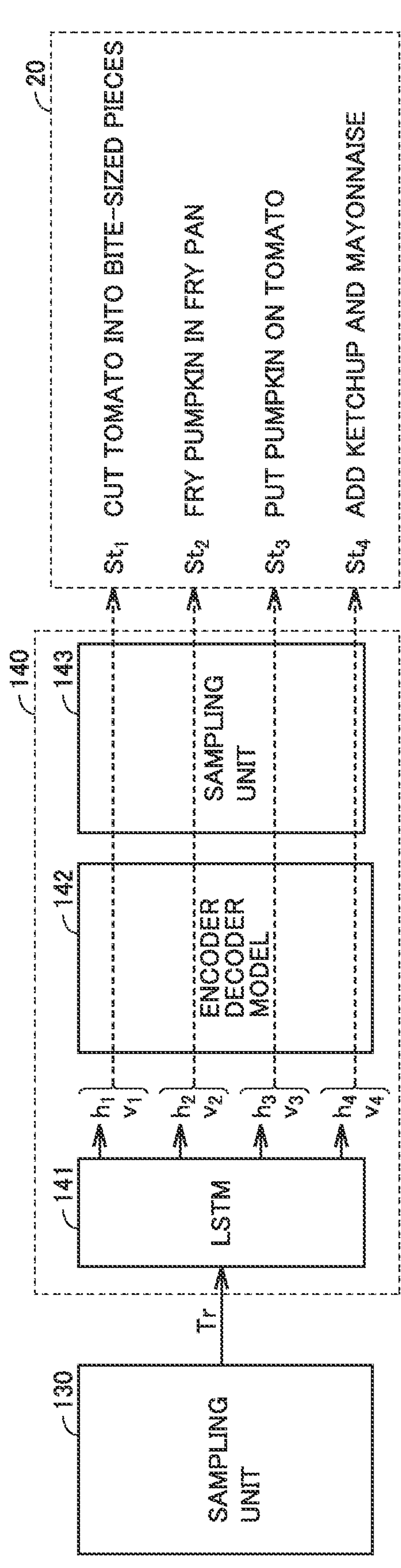
FIG. 7 is a block diagram illustrating a specific configuration of a decoding unit and output data in FIG. 1.

FIG. 7 is a block diagram illustrating a specific configuration of decoding unit 140 and output data 20 in FIG. 1. As illustrated in FIG. 7, decoding unit 140 includes an LSTM 141, an encoder decoder model 142, and a sampling unit 143. LSTM 141 includes tree-LSTM (see NPL 4), and for example, includes a child-sum LSTM. LSTM 141 obtains the feature amount corresponding to the k-th procedure of image column data 11 in tree structure Tr as a feature vector hk from a k-th hidden layer of child-sum LSTM, and outputs a vector representation $H=(h_1, h_2, \ldots, h_k, \ldots, h_M)$. Encoder decoder model 142 receives vector representation H from LSTM 141 and receives vector representation V from image encoder 111 in FIG. 2. Encoder decoder model 142 converts a pair $(h_k,v_k)$ into character string $St_k$, and outputs output data 20 including character strings $St_1$ to $St_M$ that are the procedure column data. The modality of output data 20 is the character string and is different from the modality of image column data 11 included in input data 10. Character string $St_1$ represents "cut the tomato into bite-sized pieces". Character string $St_2$ represents "fry the squash in a frying pan". Character string $St_3$ represents "place the squash on top of the tomato". Character string $St_4$ represents "add ketchup and mayonnaise". Output data 20 indicates that the cooking is performed in the order of character strings $St_1$ to $St_M$. That is, character strings $St_1$ to $St_M$ are ordered in this order. In encoder decoder model 142, a word is output using the Gumbel-Softmax function.

Machine learning processing performed in information processing device 1 in FIG. 1 will be described below. Learning unit 150 optimizes decoding unit 140 and encoding unit 100 by back propagation that targets a loss function $L_1$ for minimization. Loss function $L_1$ is expressed as the following equation (5).

Mathematical Formula 4

Mathematical Formula 4

$$L_1=L_p+L_T \tag{5}$$

Loss function $L_1$ defines an overall error generated in the process of performing the processing from encoding unit 100 to decoding unit 140 as a sum of loss functions $L_T$ and $L_P$. Loss function $L_T$ defines a cross entropy error between adjacent matrices X, Y output from encoding unit 100 and a previously-prepared correct answer matrix (correct answer graph structure). Loss function $L_P$ defines the cross entropy error between the output data output from decoding unit 140 and previously-prepared correct answer data. Loss function Li can be differentiated by determination processing of the graph structure by sampling unit 130 by the reparameterization trick, so that the error between output data 20 and the correct data can be back-propagated from the output layer of decoding unit 140 to the input layer of encoding unit 100 by the back propagation. As a result, the optimization of decoding unit 140 and encoding unit 100 can be performed end-to-end from the output layer of decoding unit 140 to the input layer of encoding unit 100, so that the accuracy of the graph structure as the intermediate representation and the accuracy of the output data can be improved.

Figure 8:
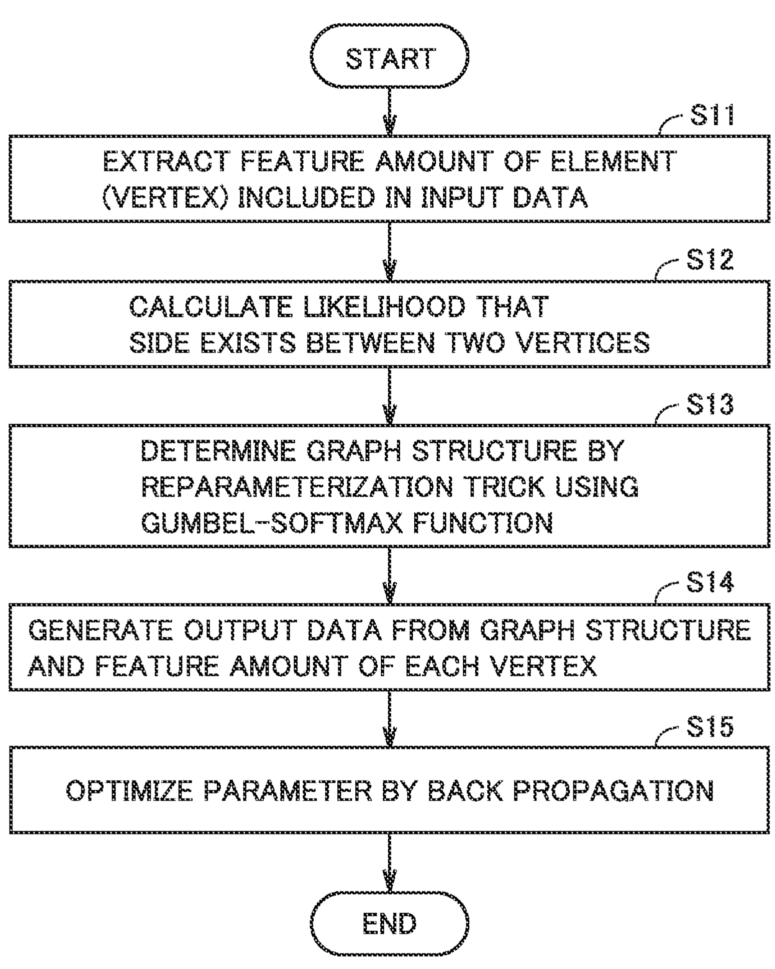
FIG. 8 is a flowchart illustrating a flow of a machine learning method performed in the information processing device.

FIG. 8 is a flowchart illustrating a flow of a machine learning method performed in information processing device 1. As illustrated in FIG. 8, in S11, encoding unit 100 extracts the feature amount of the element (vertex) included in input data 10, and advances the processing to S12. In S12, encoding unit 100 calculates the likelihood that the edge exists between the two vertices using cosine similarity between the two vertices. Similarity or a distance other than the cosine similarity may be used for the calculation of the likelihood. In S13, sampling unit 130 performs a reparameterization trick using the Gumbel-Softmax function to determine the graph structure. In S14, decoding unit 140 generates the output data from the graph structure from sampling unit 130 and the feature amount of each vertex from encoding unit 100. In S15, learning unit 150 optimizes the parameter included in each of decoding unit 140 and encoding unit 100 by the back propagation that targets loss function Li for minimization, and ends the machine learning method. The parameter includes a weight and bias of the neural network included in decoding unit 140 and encoding unit 100.

As described above, according to the information processing device and the machine learning method of the first embodiment, it is possible to improve the accuracy of the model that extracts the graph structure from the input data as the intermediate representation.

Modification of First Embodiment

In a modification of the first embodiment, the case where the adjacent matrix is reconfigured from output data will be described. The machine learning is performed such that the identity is maintained between the reconfigured adjacent matrix and the adjacent matrix output from the encoding unit, whereby lossless compression by the encoding unit is promoted. As a result, the accuracy of the graph structure as the intermediate representation and the accuracy of the output data can be further improved as compared with the first embodiment.

Figure 9:
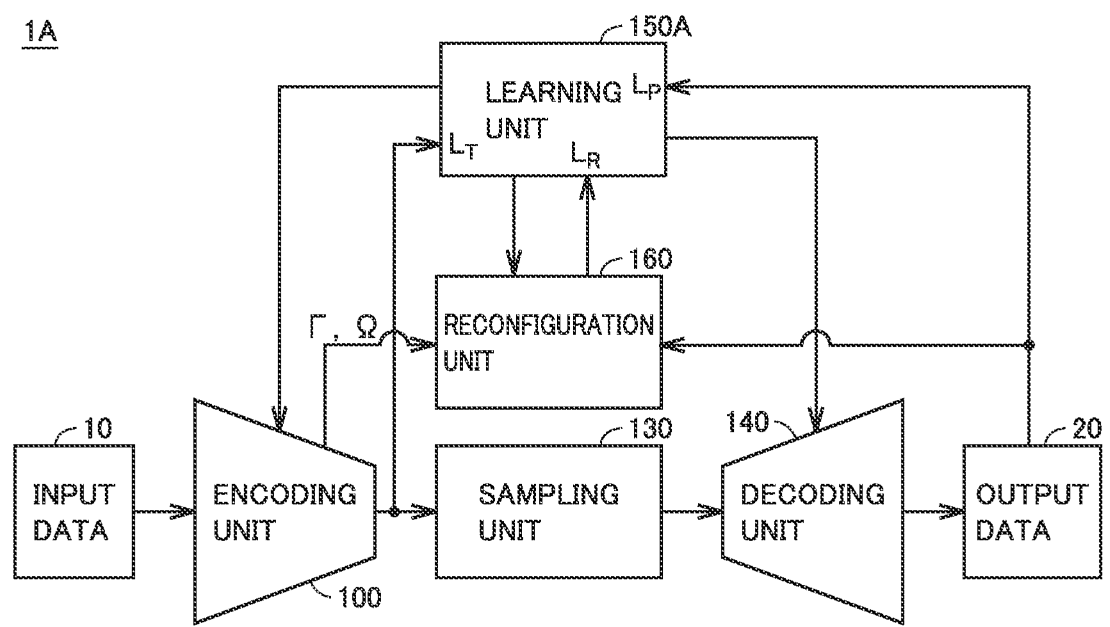
FIG. 9 is a block diagram illustrating a configuration of an information processing device according to a modification of the first embodiment.

FIG. 9 is a block diagram illustrating a configuration of an information processing device 1A according to a modification of the first embodiment. The configuration of information processing device 1A is a configuration in which learning unit 150 is replaced with a learning unit 150A while a reconfiguration unit 160 is added to the configuration of information processing device 1 in FIG. 1. The other configurations are the same, and the description thereof will not be repeated. As illustrated in FIG. 9, reconfiguration unit 160 receives output data 20 and receives vector representations Γ, Ω from encoding unit 100.

Figure 10:
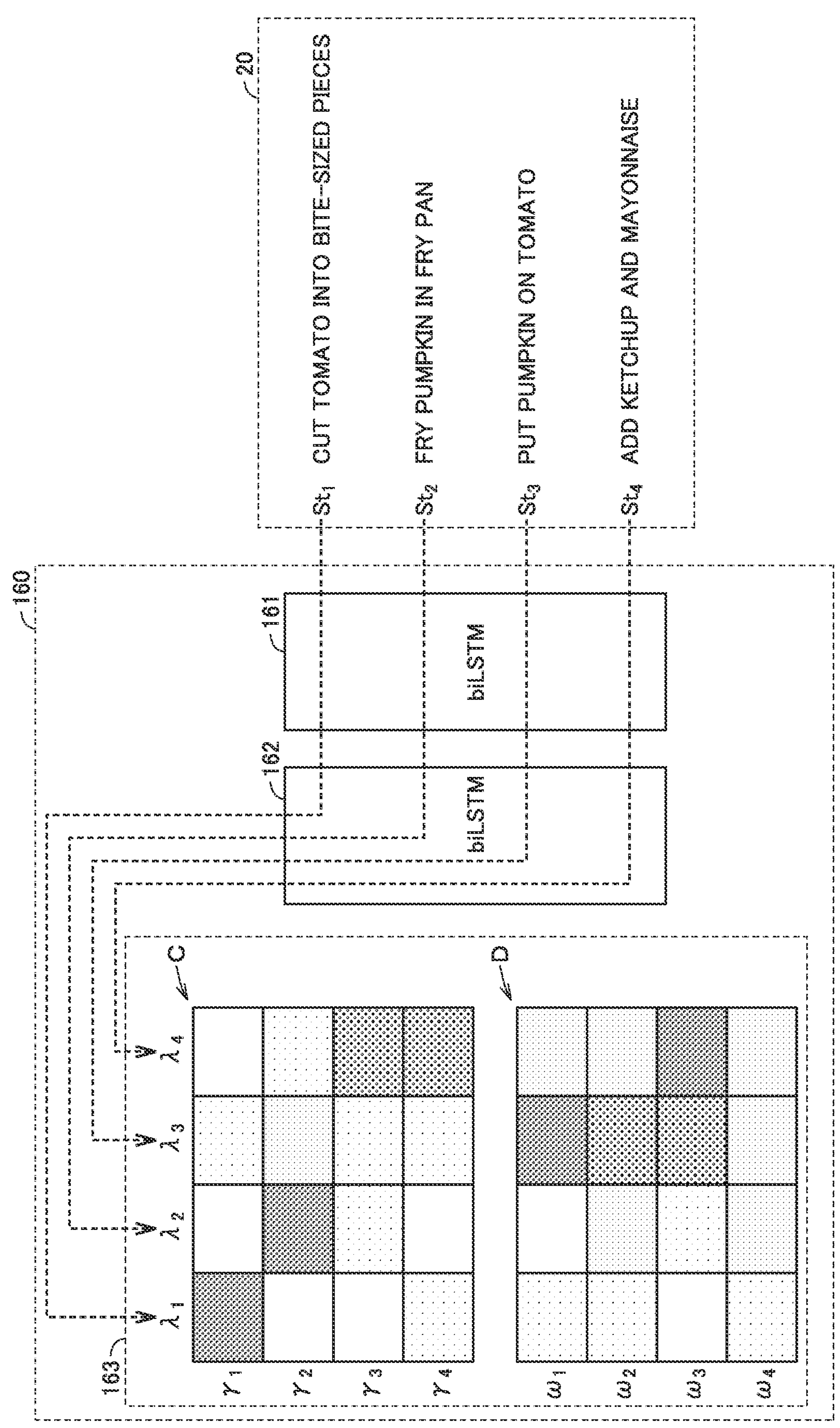
FIG. 10 is a block diagram illustrating a specific configuration of a reconfiguration unit in FIG. 9.

FIG. 10 is a block diagram illustrating a specific configuration of reconfiguration unit 160 in FIG. 9. As illustrated in FIG. 10, reconfiguration unit 160 includes biLSTMs 161, 162 and a matrix estimator 163. biLSTM 161 receives output data 20 and outputs a feature vector obtained by combining the first hidden layer and the last hidden layer for each of character strings St1 to StM. biLSTM 162 receives the feature vector of each of character strings $St_1$ to $St_M$ from biLSTM 161, and outputs vector representation $\Lambda=(\lambda_1, \lambda_2, \ldots, \lambda_k, \ldots, \lambda_M)$ (feature amount) reflecting the order of character strings $St_1$ to $St_M$. Feature vectors λ1 to XM correspond to character strings $St_1$ to $St_M$, respectively.

Matrix estimator 163 receives vector representations Γ, Ω, Λ, estimates the adjacent relation of character strings $Tx_1$ to $Tx_M$ and character strings $St_1$ to $St_M$ as an adjacent matrix C, and estimates the adjacent relation of images $Im_1$ to $Im_M$ and character strings $St_1$ to $St_M$ as an adjacent matrix D. Adjacent matrices C, D are expressed as the following equations (6), (7), respectively.

Mathematical Formula 5

Mathematical Formula 5

$$C_{i,j} = \frac{\exp(\gamma_i^T \lambda_j)}{\sum_{k=1}^{k=M} \exp(\gamma_i^T \lambda_k)} \tag{6}$$

$$D_{i,j} = \frac{\exp(\omega_i^T \lambda_j)}{\sum_{k=1}^{k=M} \exp(\omega_i^T \lambda_k)} \tag{7}$$

When the tree structure included in the input data is accurately reflected in output data 20, images $Im_1$ to $Im_M$ in image column data 11 correspond to character strings $St_1$ to $St_M$ in output data 20. Consequently, adjacent matrices C, D need to be recognized to be identical to adjacent matrices X, Y calculated by encoding unit 100. Accordingly, in the modification of the first embodiment, a loss function $L_R$ that defines an error between adjacent matrices C, D and the correct answer matrix used to calculate the error of adjacent matrices X, Y output from encoding unit 100 is added to loss function $L_1$. A loss function $L_2$ defining the overall error in the modification of the first embodiment is expressed by the following equation (8). A coefficient a of loss function $L_2$ is a hyperparameter. Loss function $L_R$ may be a loss function that defines the error between adjacent matrices C, D and adjacent matrices X, Y (correct data).

Mathematical Formula 6

Mathematical Formula 6

$$L_2=L_p+L_T+\alpha\cdot L_R \tag{8}$$

A learning unit 150A optimizes the parameter included in each of reconfiguration unit 160, decoding unit 140, and encoding unit 100 by the back propagation that targets loss function $L_2$ for minimization.

Regarding the accuracy of output data 20, the comparison of the comparative example, the first embodiment, and the modification of the first embodiment is illustrated in Table 1 below. In Table 1, GLocal Attention Cascading Networks (GLACNet) is used as a comparative example. In addition, in Table 1, scores of BiLingual Evaluation Understudy (BLEU) 1, BLEU4, Recall-Oriented Understudy for Gisting Evaluation Longest common subsequence (ROUGE-L), Consensus-based Image Description Evaluation (CIDEr)-D, and Metric for Evaluation of Translation with Explicit ORdering (METEOR), which are an automatic evaluation scale, are illustrated.

TABLE 1

| | Automatic evaluation scale | | | | |
|---|---|---|---|---|---|
| | BLEU 1 | BLEU 4 | ROUGE-L | CIDEr-D | METEOR |
| Comparative example (GLACNet) | 33.2 | 7.4 | 23.8 | 23.6 | 23.2 |
| First embodiment | 35.3 | 8.3 | 23.9 | 25.3 | 23.4 |
| Modification of first embodiment | 37.2 | 8.7 | 25.6 | 35.2 | 24.4 |

As illustrated in Table 1, in each automatic evaluation scale, the performance of the first embodiment exceeds the performance of the comparative example. In addition, the performance of the modification of the first embodiment exceeds the performance of the first embodiment.

As described above, according to the information processing device and the machine learning method of the modification of the first embodiment, the accuracy of the model extracting the graph structure from the input data as the intermediate representation can be further improved as compared with the first embodiment.

Second Embodiment

The configuration in which the tree structure is extracted as the graph structure from the input data has been described in the first embodiment. The graph structure extracted from the input data is not limited to the tree structure, but for example, may be an N-graph structure (N is a natural number greater than or equal to 2). In a second embodiment, a configuration in which a two-graph structure is extracted from input data will be described as an example of the N-graph structure.

Figure 11:
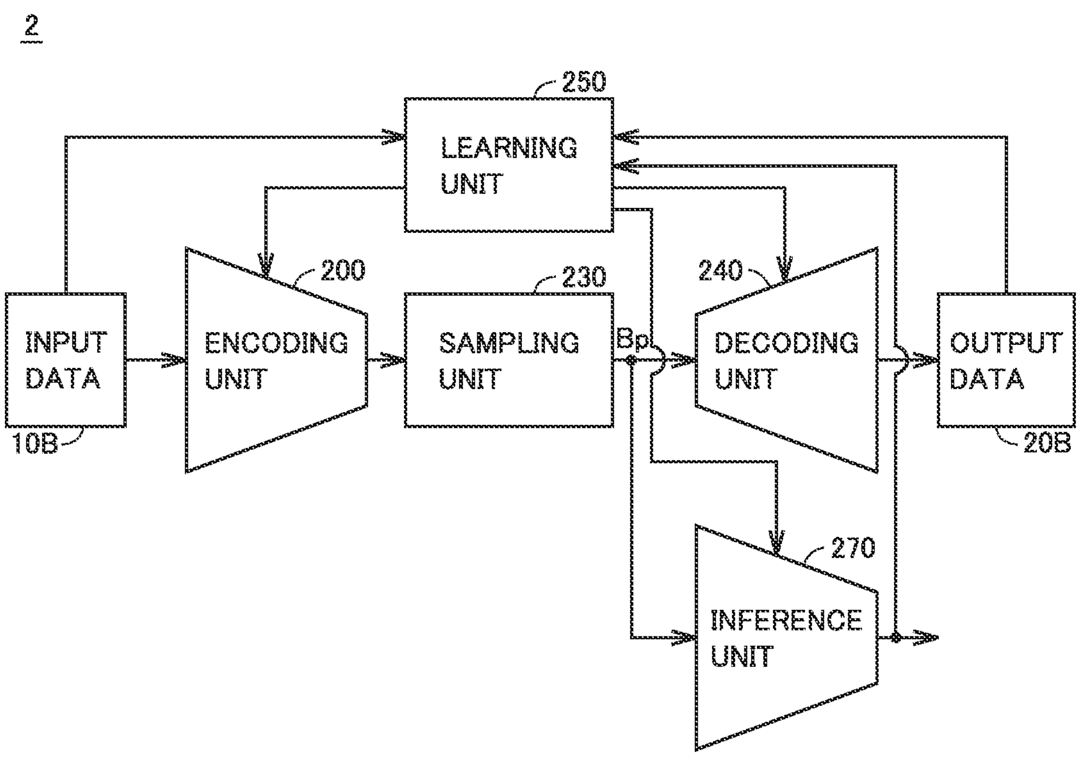
FIG. 11 is a block diagram illustrating a configuration of an information processing device according to a second embodiment.

FIG. 11 is a block diagram illustrating a configuration of an information processing device 2 of the second embodiment. As illustrated in FIG. 11, information processing device 2 includes an encoding unit 200, a sampling unit 230, a decoding unit 240, a learning unit 250, and an inference unit 270. Encoding unit 200, sampling unit 230, decoding unit 240, and learning unit 250 form a variational autoencoder (VAE).

Encoding unit 200 extracts a feature amount of each of a plurality of vertices of the graph structure included in an input data 10B. Encoding unit 200 divides the plurality of vertices into two subsets $Sb_1$, $Sb_2$ having no common vertex. Encoding unit 200 calculates the likelihood that the edge exists between the vertex included in subset $Sb_1$ and the vertex included in subset $Sb_2$, and outputs the adjacent matrix having the likelihood as the component to sampling unit 230. That is, encoding unit 200 performs two-graph matching between subsets $Sb_1$ and $Sb_2$.

Sampling unit 230 performs the reparameterization trick using the Gumbel-Softmax function on the adjacent matrix from encoding unit 200, determines a two-graph structure Bp, and outputs two-graph structure Bp and the feature amount of each of the plurality of vertices included in two-graph structure Bp to decoding unit 240 and inference unit 270. Decoding unit 240 reproduces an output data 20B from two-graph structure Bp and the feature amount. Inference unit 270 performs inference based on two-graph structure Bp and the feature amount, and outputs an inference result. For example, inference unit 270 includes a graph neural network (GNN).

Learning unit 250 optimizes inference unit 270, decoding unit 240, and encoding unit 200 by the back propagation. The loss function to be targeted for minimization in the back propagation includes the error between output data 20B and input data 10B (correct data) and the error between the inference result of inference unit 270 and the correct data included in the learning data set. That is, learning unit 250 performs semi-supervised learning on inference unit 270, decoding unit 240, and encoding unit 200. Specifically, learning unit 250 performs unsupervised learning on decoding unit 240 and encoding unit 200, and performs supervised learning on inference unit 270.

The main purpose of information processing device 2 is to output the inference result by inference unit 270. Optimization of the VAE formed by encoding unit 200, sampling unit 230, decoding unit 240, and learning unit 250 is positioned as a subtask implementing lossless compression from input data 10B to the two-graph structure.

Figure 12:
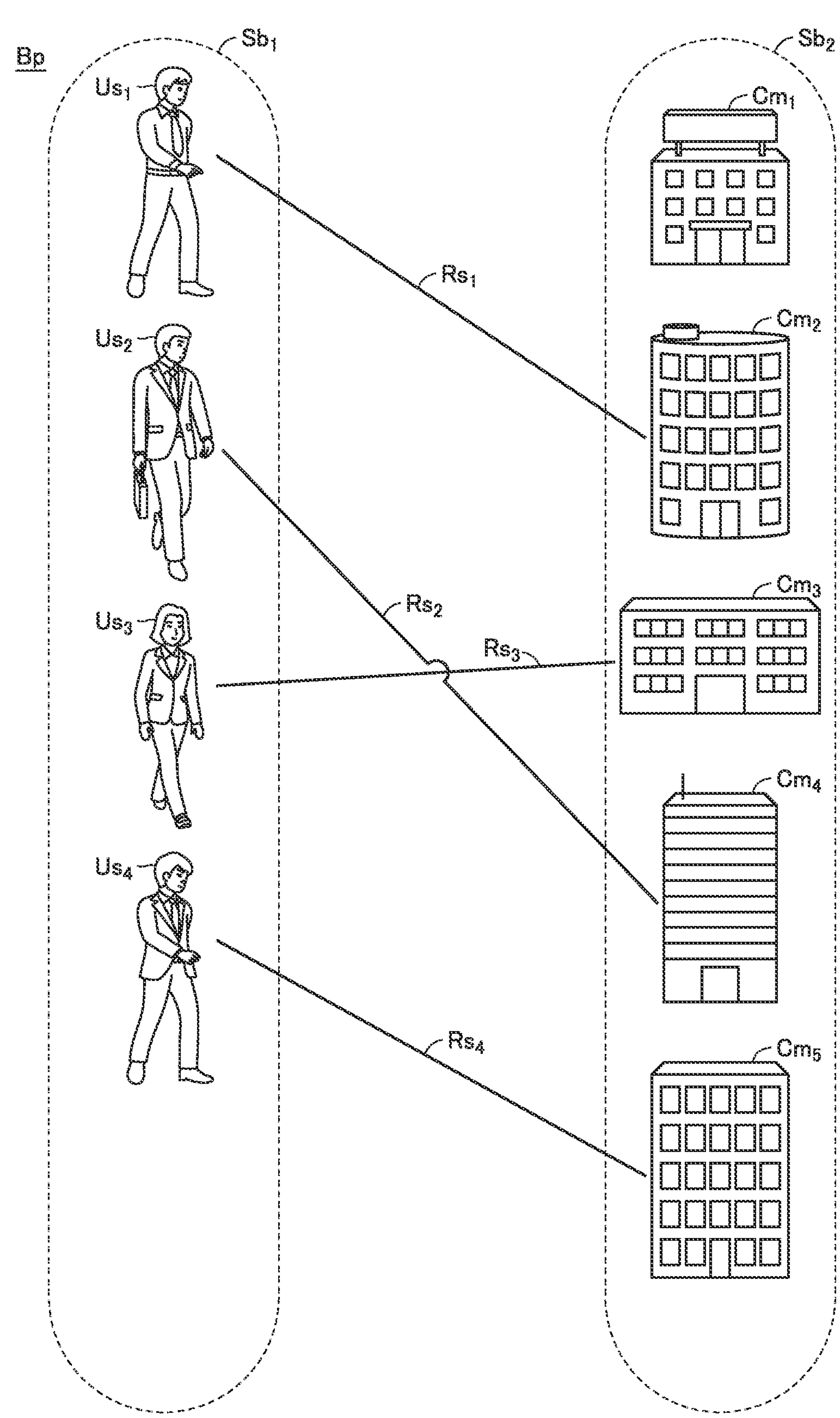
FIG. 12 is a view illustrating an example of a two-graph structure between a plurality of users and a plurality of companies extracted from the input data.

The case where a history of a user search operation on the search system is set as input data 10B will be described below. FIG. 12 is a view illustrating an example of two-graph structure Bp between a plurality of users and a plurality of companies extracted from input data 10B. FIG. 12 illustrates a correlation between users $Us_1$, $Us_2$, $Us_3$, $Us_4$ and companies $Cm_1$, $Cm_2$, $Cm_3$, $Cm_4$, $Cm_5$. As illustrated in FIG. 12, user $Us_1$ and company $Cm_2$ are connected by an edge $Rs_1$. User $Us_2$ and company $Cm_4$ are connected by an edge $Rs_2$. User $Us_3$ and company $Cm_3$ are connected by an edge $Rs_3$. User $Us_4$ and company $Cm_5$ are connected by an edge $Rs_4$. FIG. 13 is a view illustrating a matrix representing two-graph structure Bp in FIG. 12. Inference unit 270 in FIG. 11 receives two-graph structure Bp, infers the company matching the needs of each user, and recommends the company to the user.

As described above, according to the information processing device and the machine learning method of the second embodiment, the accuracy of the model that extracts the graph structure from the input data as the intermediate representation can be improved.

Third Embodiment

A configuration in which a plurality of sensors is structured as a graph structure based on time-series data of detection values of a plurality of sensors in a plurality of processes included in a manufacturing facility to specify a process in which a defect is generated in a product will be described in a third embodiment.

Figure 14:
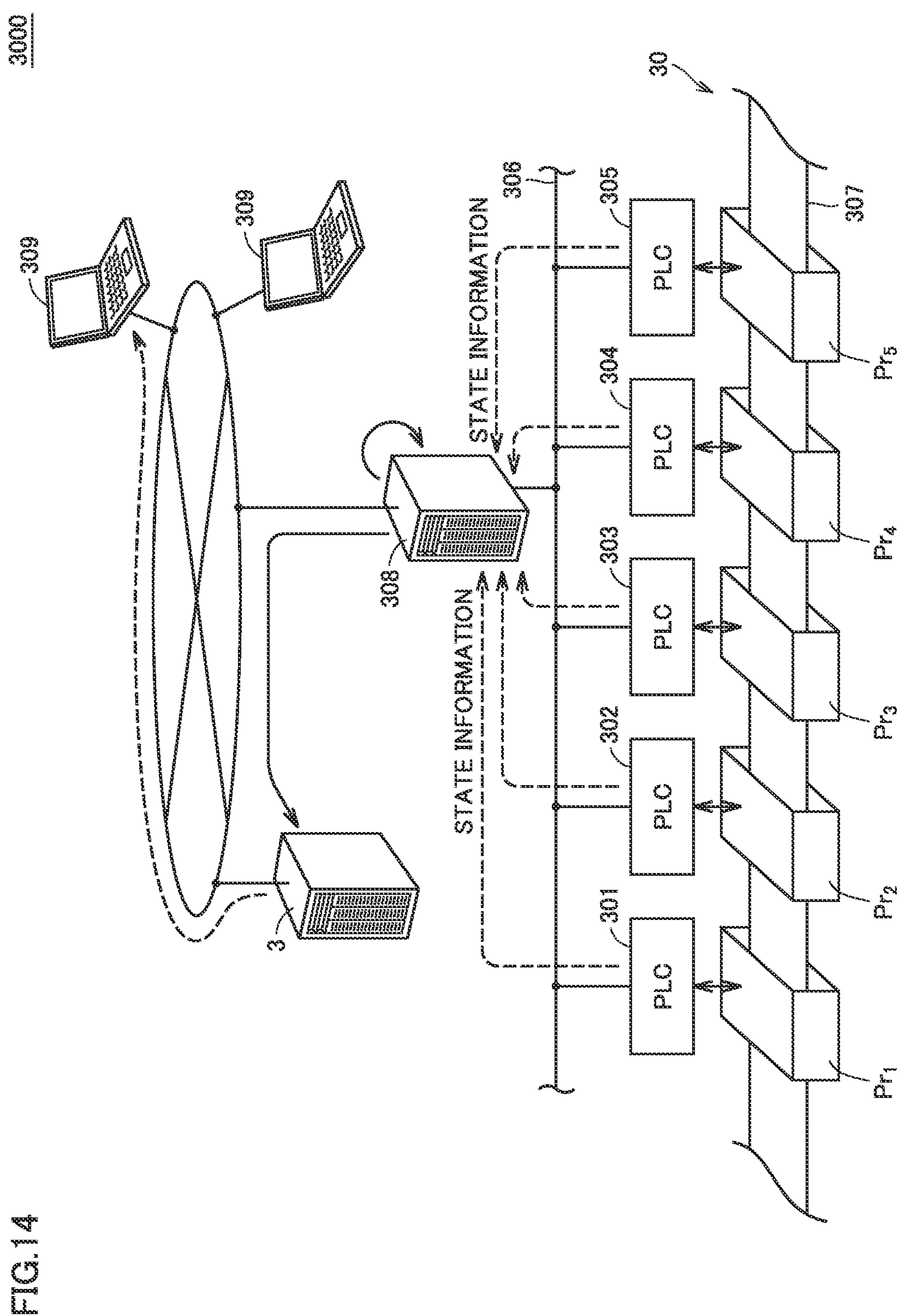
FIG. 14 is a schematic diagram illustrating a configuration example of a management system according to a third embodiment.

FIG. 14 is a schematic diagram illustrating a configuration example of a management system 3000 of the third embodiment. Referring to FIG. 14, management system 3000 is associated with a manufacturing facility 30 including a plurality of processes, and provides a function managing quality of the product manufactured by manufacturing facility 30. In FIG. 14, five consecutive processes $Pr_1$, $Pr_2$, $Pr_3$, $Pr_4$, $Pr_5$ are illustrated along a conveyor 307 conveying a workpiece. The workpiece passes through processes $Pr_1$ to $Pr_5$ in this order. In each of processes $Pr_1$ to $Pr_5$, a sensor detecting the state of the process is installed. Processes $Pr_1$ to $Pr_5$ are controlled and monitored by programmable logic controllers (PLCs) 301, 302, 303, 304, 305 that are an example of the control device.

PLCs 301 to 305 are connected so as to be able to perform data communication through a local network 306. PLCs 301 to 305 transmit state information related to the process to be controlled to a relay server device 308 on local network 306 every predetermined period or every event. The state information includes time-series data (sensor time-series data) of a plurality of detection values detected at a plurality of sampling times by the sensor provided in the process.

Relay server device 308 transfers the state information from each of PLCs 301 to 305 to a collection and analysis server device 3 (information processing device) through the Internet. Relay server device 308 may perform necessary preprocessing on the state information.

Collection and analysis server device 3 collects the state information received from relay server device 308 and analyzes the collected information. Collection and analysis server device 3 outputs an analysis result to a terminal device 309 through the Internet when a predetermined condition is satisfied or when a request is received from terminal device 309.

FIG. 14 illustrates a configuration in which PLCs are provided in each of the plurality of processes installed in single manufacturing facility 30 and the PLCs are connected to relay server device 308 through the same local network 306 as a typical example, but the present invention is not limited thereto. For example, a configuration in which a plurality of PLCs is directly connected to collection and analysis server device 3 may be adopted without disposing relay server device 308. In this case, each PLC transmits required information to collection and analysis server device 3.

Alternatively, a plurality of relay server devices 308 may be provided. In this case, a certain relay server device 308 may transfer the state information from some PLCs to collection and analysis server device 3, and another relay server device 308 may transfer the state information from the remaining PLCs to collection and analysis server device 3.

Figure 15:
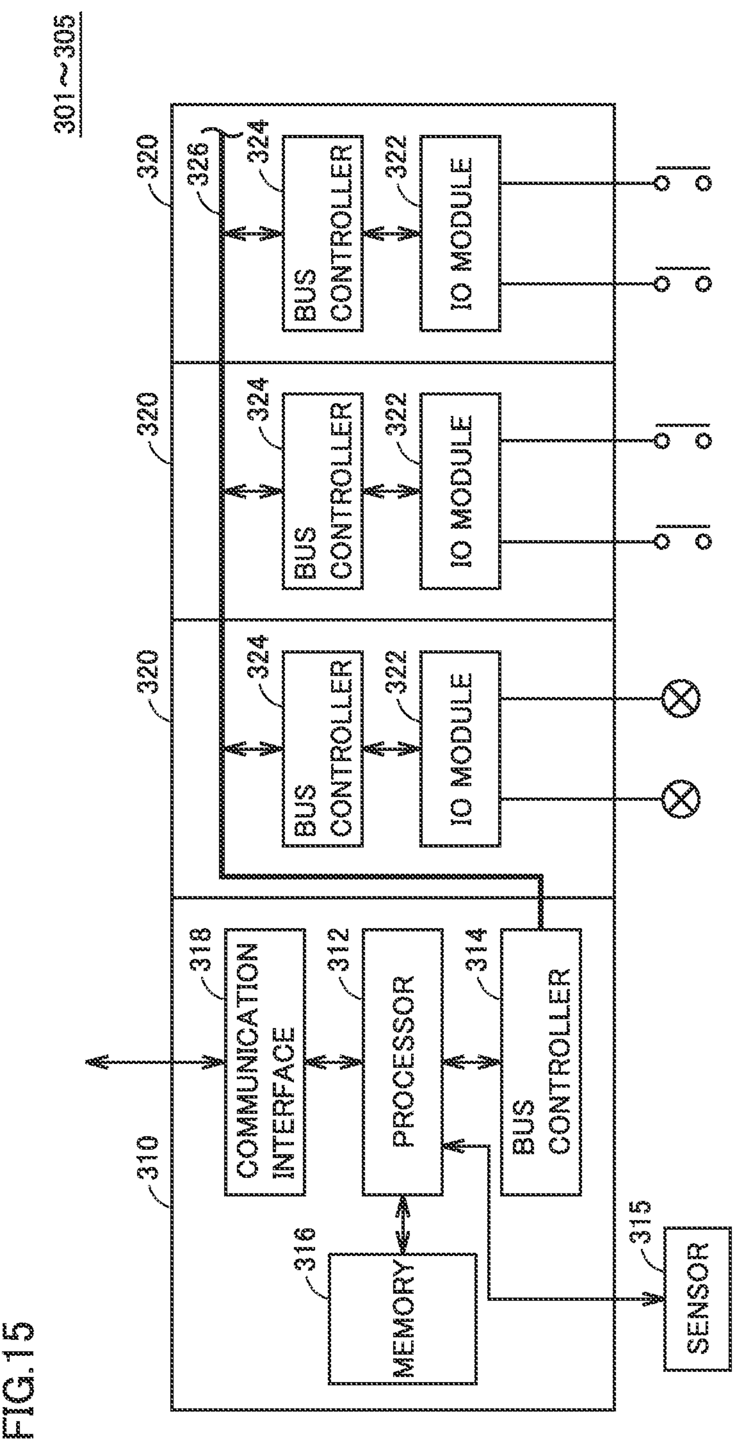
FIG. 15 is a schematic diagram illustrating an example of a hardware configuration of a PLC constituting the management system in FIG. 14.

A hardware configuration example of the PLC will be described below. FIG. 15 is a schematic diagram illustrating an example of a hardware configuration of PLCs 301 to 305 constituting management system 3000 in FIG. 14. Referring to FIG. 15, each of PLCs 301 to 305 includes an arithmetic unit 310 and one or a plurality of functional units 320. Arithmetic unit 310 is an arithmetic device that executes a previously-stored user program or the like, acquires a field signal (information indicating the state of the facility to be controlled, or the like) from functional unit 320, and outputs a required control signal through functional unit 320.

Arithmetic unit 310 includes a processor 312 that executes the user program and the like, a memory 316 that stores the user program, an operating system (OS), various data, and the like, a bus controller 314 that controls data exchange through an internal bus 326, and a communication interface 318. Memory 316 may be configured by combining a volatile storage device such as a dynamic random access memory (DRAM) and a nonvolatile storage device such as a flash memory. Processor 312 acquires a detection value from a sensor 315 installed in the process corresponding to each of PLCs 301 to 305. For example, the detection value includes a current value, a voltage value, a power value, a temperature, humidity, or a vibration value. A plurality of sensors 315 may be provided in one process.

One or a plurality of communication ports may be provided in communication interface 318 according to a target device that exchanges the data. For example, a communication port conforming to Ethernet (registered trademark) for connection to local network 306 (see FIG. 14), a communication port conforming to a universal serial bus (USB) for connection to a personal computer or the like, or a communication port supporting a serial line or a parallel line may be mounted.

Functional unit 320 may provide an input output (IO) function exchanging various types of information with the facility to be controlled. Specifically, functions such as a digital input (DI) that receives a digital signal, a digital output (DO) that outputs a digital signal, an analog input (AI) that receives an analog signal, and an analog output (AO) that outputs an analog signal may be implemented. In addition, special functions such as proportional integral derivative (PID) control or motion control may be implemented.

For example, each of functional units 320 that provides the IO function includes an IO module 322 and a bus controller 324 that controls data exchange with arithmetic unit 310 through internal bus 326. Each of IO modules 322 acquires state information from the process to be controlled, and sends the state information to relay server device 308 and collection and analysis server device 3 through arithmetic unit 310.

In management system 3000, any PLC may be adopted as long as the PLC includes an interface outputting internal information to an external device using any communication means. The hardware configuration of the PLC is not limited to the configuration in FIG. 15, but any configuration can be adopted. In practice, it is assumed that manufacturers and models are not unified among the plurality of PLCs disposed in manufacturing facility 30 of FIG. 14. In management system 3000, relay server device 308 absorbs such differences in the manufacturer and model of the PLC.

Figure 16:
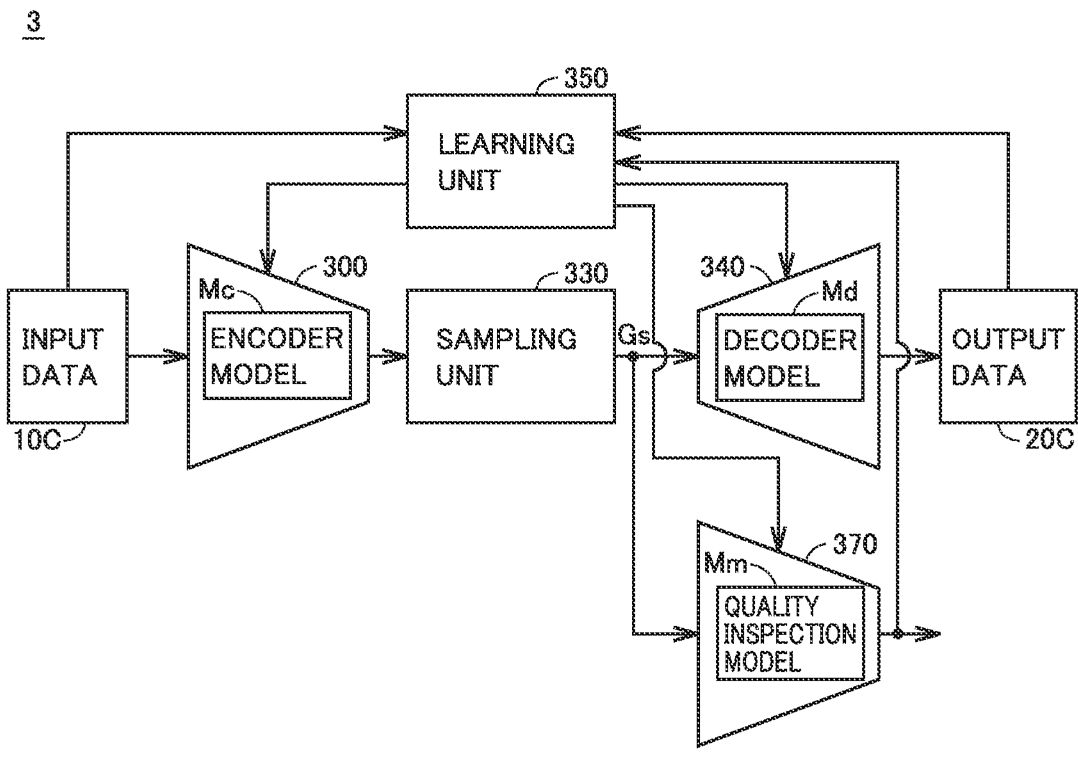
FIG. 16 is a block diagram illustrating a functional configuration of a collection and analysis server device in FIG. 14.

FIG. 16 is a block diagram illustrating a functional configuration of collection and analysis server device 3 in FIG. 14. As illustrated in FIG. 16, collection and analysis server device 3 includes an encoding unit 300, a sampling unit 330, a decoding unit 340, and a quality inspection unit 370 (inference unit). An input data 10C includes sensor time-series data from PLC 301 to 305. Encoding unit 300, sampling unit 330, decoding unit 340, and a learning unit 350 form the variational autoencoder (VAE).

Encoding unit 300 includes an encoder model Mc. Encoder model Mc extracts the graph structure representing a correlation between sensors included in input data 10C from input data 10C. Encoding unit 300 extracts the feature amount of each of a plurality of sensors that are the vertex of the graph structure from the sensor time-series data. Encoding unit 300 calculates the likelihood that the edge exists between two vertices included in the plurality of vertices, and outputs the adjacent matrix having the likelihood as the component to sampling unit 330.

Sampling unit 330 performs the reparameterization trick using the Gumbel-Softmax function on the adjacent matrix from encoding unit 300, determines a graph structure Gs, and outputs graph structure Gs and the feature amount of each of the plurality of vertices of graph structure Gs to decoding unit 340 and quality inspection unit 370.

Decoding unit 340 includes a decoder model Md. Decoder model Md reproduces output data 20C from graph structure Gs and the feature amount.

Quality inspection unit 370 includes a quality inspection model Mm. Quality inspection model Mm calculates quality data representing the quality of the product based on graph structure Gs and the feature amount. For example, quality inspection part 370 includes GNN. Quality inspection unit 370 visualizes the error between the quality data and the reference quality data in graph structure Gs. The reference quality data is standard quality data corresponding to a normal product. The larger the error between the quality data and the reference quality data, the larger the defect degree included in the quality data. For example, heat mapping of the error using Gradient-weighted Class Activation Mapping (GradCAM) can be exemplified as a method for visualizing the error in graph structure Gs.

Learning unit 350 optimizes the parameters of the neural network included in each of quality check model Mm, decoder model Md, and encoder model Mc by back propagation. The parameter includes the weight and the bias of the neural network. The loss function to be targeted for minimization in the back propagation includes the error between output data 20C and input data 10C (correct data) and the error between the inspection result of quality inspection unit 370 and the correct quality data included in the learning data set. That is, learning unit 350 performs the semi-supervised learning on quality inspection unit 370, decoding unit 340, and encoding unit 300. Specifically, learning unit 350 performs the unsupervised learning on decoding unit 340 and encoding unit 300, and performs the supervised learning on quality inspection unit 370.

The main purpose of collection and analysis server device 3 is to output the inspection result by quality inspection unit 370. The optimization of the VAE formed by encoding unit 300, sampling unit 330, decoding unit 340, and learning unit 350 is positioned as a subtask implementing the lossless compression from input data 10C to the graph structure.

Figure 17:
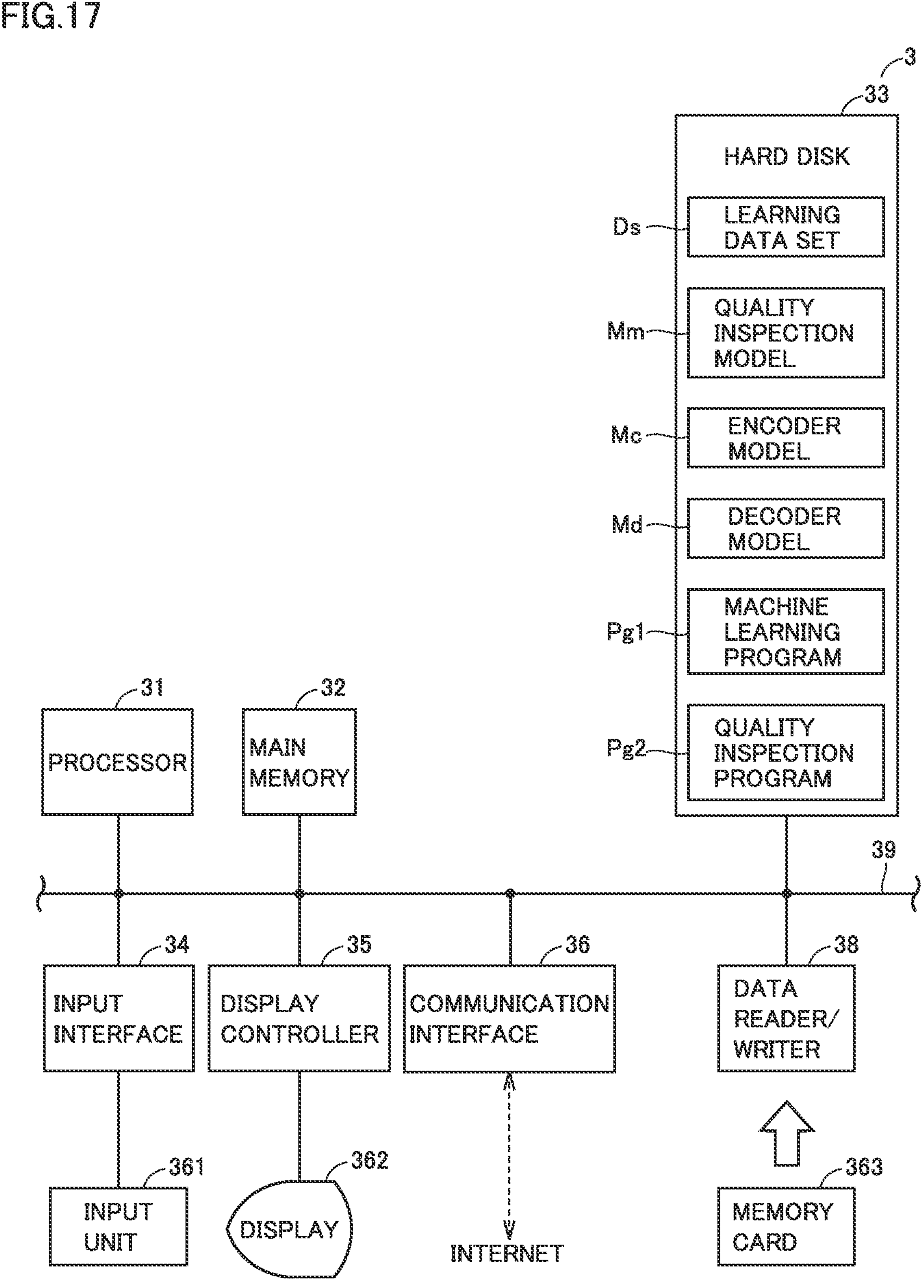
FIG. 17 is a block diagram illustrating a hardware configuration of the collection and analysis server device in FIG. 14.

FIG. 17 is a block diagram illustrating a hardware configuration of collection and analysis server device 3 in FIG. 14. As illustrated in FIG. 17, collection and analysis server device 3 includes a processor 31 that is an arithmetic processing unit, a main memory 32 and a hard disk 33 that are a storage unit, an input interface 34, a display controller 35, a communication interface 36, and a data reader/writer 38. These units are data-communicably connected to each other through a bus 39.

Processor 31 includes a central processing unit (CPU). Processor 31 may further include a graphics processing unit (GPU). Processor 31 develops a program (code) stored in hard disk 33 in main memory 32 and executes the program in a predetermined order to perform various operations.

Main memory 32 is typically a volatile storage device such as a dynamic random access memory (DRAM). Main memory 32 holds the program read from hard disk 33.

Input interface 34 mediates data transmission between processor 31 and an input unit 361. For example, input unit 361 includes a mouse, a keyboard, or a touch panel. That is, input interface 34 receives an operation command given by the user operating input unit 361.

Display controller 35 is connected to a display 362 that is a typical example of the display device, and notifies the user of a result of image processing in processor 31 and the like. That is, display controller 35 is connected to display 362 to control the display on display 362. For example, display 362 is a liquid crystal display, an organic EL (Electro Luminescence) display, or other display devices.

Communication interface 36 mediates the data transmission between processor 31 and other external devices through the Internet. Communication interface 36 typically includes Ethernet (registered trademark), and a universal serial bus (USB).

Data reader and writer 38 mediates the data transmission between processor 31 and a memory card 363 that is a storage medium. For example, memory card 363 stores the program to be executed in collection and analysis server device 3. Data reader/writer 38 reads the program from memory card 363. Memory card 363 includes a general-purpose semiconductor storage device such as a compact flash (CF) and a secure digital (SD), a magnetic recording medium such as a flexible disk, and an optical recording medium such as a compact disk read only memory (CD-ROM). Another output device such as a printer may be connected to collection and analysis server device 3 as needed.

Hard disk 33 is a non-volatile magnetic storage device. Hard disk 33 stores a learning data set Ds, quality inspection model Mm, encoder model Mc, decoder model Md, a machine learning program Pg1, and a quality inspection program Pg2. Various setting values and the like may be stored in hard disk 33. A semiconductor storage device such as a flash memory may be adopted in addition to or instead of hard disk 33.

Learning data set Ds includes a plurality of learning data. Each of the plurality of learning data is a combination of time-series data of the detection value by each sensor of the plurality of processes through which the product passes and correct quality data corresponding to the quality of the product.

Learning data set Ds, encoder model Mc, decoder model Md, and quality check model Mm are referred to in machine learning program Pg1. Processor 31 that executes machine learning program Pg1 implements encoding unit 300, sampling unit 330, decoding unit 340, learning unit 350, and quality inspection unit 370 in FIG. 16. Processor 31 executes machine learning program Pg1 to adapt each of encoder model Mc, decoder model Md, and quality check model Mm to the learned state.

Encoder model Mc and quality inspection model Mm are referred to in quality inspection program Pg2. Processor 31 executes quality inspection program Pg2 to calculate the quality data of the product from the sensor time-series data corresponding to the product, and visualizes the error between the quality data and the reference quality data in graph structure Gs. The error visualized in graph structure Gs of the error is output to display 362 and terminal device 309.

Figure 18:
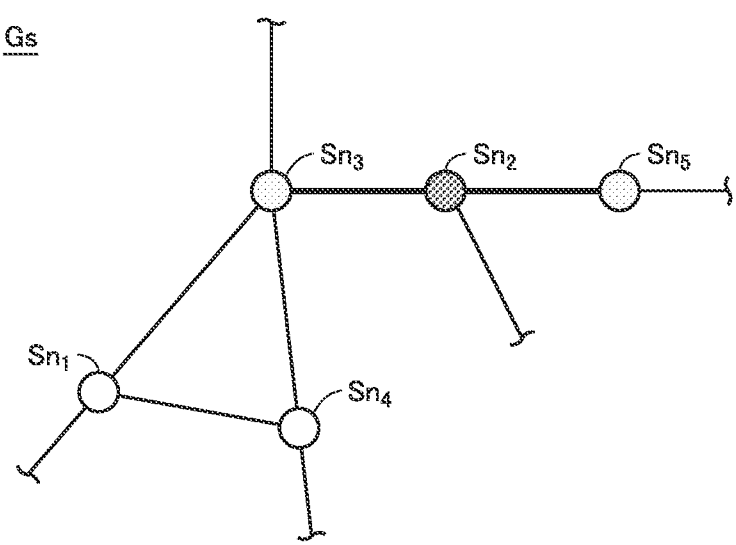
FIG. 18 is a view illustrating an example of a graph structure visualized together with an error between quality data and reference quality data.

FIG. 18 is a view illustrating an example of graph structure Gs visualized together with the error between the quality data and the reference quality data. In FIG. 18, vertexes $Sn_1$ to $Sn_5$ correspond to the sensors provided in processes $Pr_1$ to $Pr_5$ in FIG. 14, respectively. A thicker hatched vertex indicates that the detection value of the sensor corresponding to the vertex deviates from the normal value.

As illustrated in FIG. 18, vertex $Sn_3$ is connected to vertexes $Sn_1$, $Sn_4$. Vertex $Sn_5$ is connected to vertex $Sn_2$. Vertex $Sn_2$ is the thickest, and vertexes $Sn_1$, $Sn_4$ are the thinnest. The edge connecting vertexes $Sn_2$, $Sn_3$ and the edge connecting vertexes $Sn_2$, $Sn_5$ are emphasized to be thicker than other edges. Graph structure Gs in which the error is visualized represents the correlation between the detection values of the plurality of sensors, and also illustrates the detection value of the sensor contributing to the defect (the error between the quality data and the reference quality data) included in the product. In FIG. 18, the detection value of the sensor most contributing to the defect included in the product is the detection value of the sensor provided in process $Pr_2$ corresponding to vertex $Sn_2$. Consequently, there is a high possibility that the defect is generated in process $Pr_2$. In processes $Pr_3$, $Pr_5$ corresponding to vertexes $Sn_3$, $Sn_5$ connected to vertex $Sn_2$ in graph structure Gs, there is the possibility that the defect is generated after process $Pr_2$. In processes $Pr_1$, $Pr_4$ corresponding to vertexes $Sn_1$, $Sn_4$, there is the lowest possibility that the defect is generated. According to graph structure Gs in which the error is visualized, the process causing the generation of the defect included in the product completed through the plurality of processes can be easily specified.

As described above, according to the information processing device and the machine learning method of the third embodiment, the accuracy of the model that extracts the graph structure from the input data as the intermediate representation can be improved.

Figure 19:
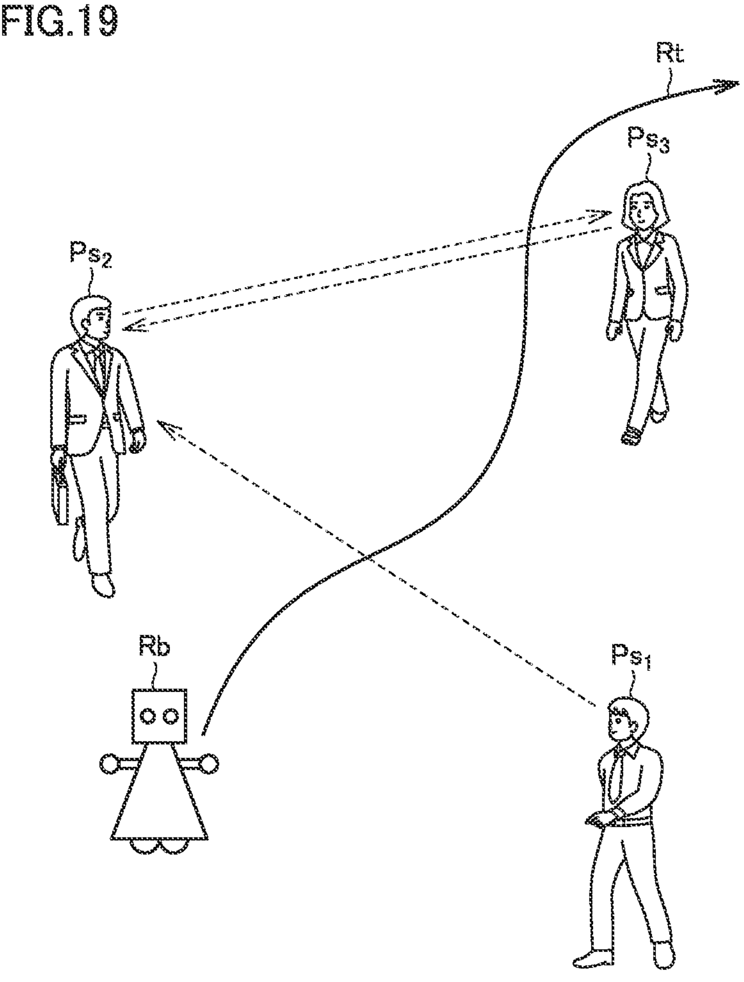
FIG. 19 is a view illustrating route planning by a robot corresponding to the information processing device of the embodiment.

Other Application Examples of the Information Processing Device and the Machine Learning Method of Embodiment The information processing device and the machine learning method of the embodiment can be applied to route planning based on people flow prediction. FIG. 19 is a view illustrating route planning by a robot Rb corresponding to the information processing device of the embodiment. As illustrated in FIG. 19, a visual field of robot Rb includes pedestrians $Ps_1$, $Ps_2$, $Ps_3$. Pedestrian $Ps_1$ is watching pedestrian $Ps_2$. Pedestrian $Ps_2$ is watching pedestrian $Ps_3$. Pedestrian $Ps_3$ is watching pedestrian $Ps_2$. Robot Rb extracts the directed graph structure having each of the pedestrians $Ps_1$ to $Ps_3$ as the vertex based on the posture, the line-of-sight direction, the relative positional relationship between the pedestrians $Ps_1$ to $Ps_3$, and the like of each of the pedestrians $Ps_1$ to $Ps_3$ included in the visual field moving image that is time-series data.

Figure 20:
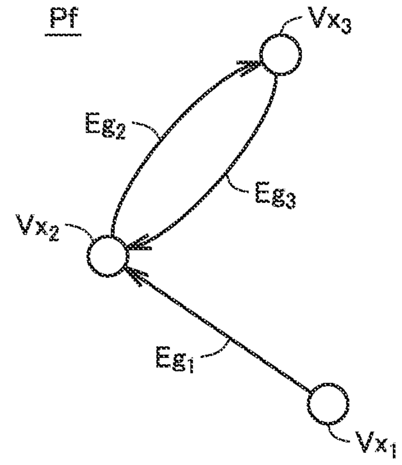
FIG. 20 is a view illustrating a directed graph structure extracted by the robot in FIG. 19.

FIG. 20 is a view illustrating a directed graph structure Pf extracted by robot Rb in FIG. 19. In FIG. 19, vertexes $Vx_1$, $Vx_2$, $Vx_3$ correspond to pedestrians $Ps_1$, $Ps_2$, $Ps_3$ in FIG. 19, respectively. As illustrated in FIG. 20, vertex $Vx_1$ and vertex $Vx_2$ are connected by an edge $Eg_1$ from vertex $Vx_1$ toward vertex $Vx_2$. Vertex $Vx_2$ and vertex $Vx_3$ are connected by an edge Egg from vertex $Vx_2$ toward vertex $Vx_3$ and an edge $Eg_1$ from vertex $Vx_3$ toward vertex $Vx_2$.

FIG. 21 is a view illustrating the matrix representation corresponding to directed graph structure Pf in FIG. 20. Robot Rb inputs directed graph structure Pf in FIG. 21 to the inference unit, performs the people flow prediction for pedestrians $Ps_1$ to $Ps_3$, and plans a route Rt in FIG. 19 capable of avoiding pedestrians $Ps_1$ to $Ps_3$. For example, the inference unit includes a social GAN (Generative Adversarial Network).

The information processing device and the machine learning method of the embodiment are also applicable to prediction of traffic congestion. The graph structure, in which a traffic volume at each time in a plurality of points connected by a road are used as time-series input data, each of the plurality of points at each time from the input data is set as the vertex, and a relationship in traffic volume between two points over different times is set as the edge, is extracted in the prediction of the traffic congestion. That is, the graph structure is extracted from the input data as the result of the N-graph matching in which a plurality of points at each time are set as a subset of the vertex set. The information processing device predicts the traffic congestion at each point in a specific time based on the graph structure.

The information processing device and the machine learning method of the embodiment are also applicable to materials informatics (MI). In the application example to the materials informatics, a physical property of a molecular structure is estimated by making the vertex and the edge of the graph structure extracted from the input data correspond to the atom and the bond of the molecular structure.

Appendix

The above embodiments include the following technical ideas.

Configuration 1

An information processing device (1, 1A, 2, 3) that extracts a graph structure (Tr, Bp, Gs, Pf) representing a correlation between elements included in input data (10, 10B, 10C) from the input data (10, 10B, 10C) to generate output data (20, 20B, 20C) from the graph structure (Tr, Bp, Gs, Pf), the information processing device (1, 1A, 2, 3) including:

- an encoding unit (100, 200, 300) configured to extract a feature amount (Θ, Φ, Ω, Γ) of each of a plurality of vertices ($Lf_1$ to $Lf_4$, $Nd_1$ to $Nd_4$, $Us_1$ to $Us_4$, $Cm_1$ to $Cm_5$, $Sn_1$ to $Sn_5$, $Vx_1$ to $Vx_3$) included in the graph structure (Tr, Bp, Gs, Pf) from the input data (10, 10B, 10C) to calculate a likelihood that an edge ($Br_1$ to $Br_7$, $Rs_1$ to $Rs_4$, $Eg_1$ to $Eg_3$) representing the correlation is connected to the vertex;
- a sampling unit (130, 230, 330) configured to determine the graph structure (Tr, Bp, Gs, Pf) based on a conversion result of a Gumbel-Softmax function for the likelihood;
- a decoding unit (140, 240, 340) configured to receive the graph structure (Tr, Bp, Gs, Pf) and the feature amount (Θ, Φ, Ω, Γ) to generate the output data (20, 20B, 20C); and
- a learning unit (150, 250, 350) configured to optimize the decoding unit (140, 240, 340) and the encoding unit (100, 200, 300) by back propagation that targets a loss function for minimization, the loss function including an error ($L_P$) between the output data (20, 20B, 20C) and correct data.

Configuration 2

The information processing device (1A) according to the configuration 1, further including a reconfiguration unit (160) configured to reconfigure the graph structure (Tr) from the output data (20),

- in which the loss function includes an error ($L_R$) between an output from the reconfiguration unit (160) and a correct graph structure.

Configuration 3

The information processing device (2, 3) according to the configuration 1 or 2, further including an inference unit (270, 370) configured to receive the graph structure (Bp, Gs) from the sampling unit (230, 330) to output an inference result for the input data (10B, 10C),

- in which the learning unit (250, 350) performs unsupervised learning for the decoding unit (240, 340) and the encoding unit (100, 200), and performs supervised learning for the inference unit (270, 370).

Configuration 4

The information processing device (1, 1A) according to any one of the configurations 1 to 3, in which the input data (10) includes first data (11) and second data (12), modality of the first data (11) is different from modality of the second data (12), and the encoding unit (100) includes:

a first encoder (110) that extracts a feature amount (Θ, Φ) of the first data (11); and a second encoder (120) that extracts a feature amount (F) of the second data (12).

Configuration 5

The information processing device (1,1A) according to any one of the configurations 1 to 4, in which modality of the output data (20) is different from modality of the input data (10).

Configuration 6

A machine learning method performed by a processor (31) that executes a machine learning program (Pg1) stored in a storage unit (33) for a model (Mc, Md) that extracts a graph structure (Tr, Bp, Gs, Pf) representing a correlation between elements included in input data (10, 10B, 10C) from the input data (10, 10B, 10C) to generate output data (20, 20B, 20C) from the graph structure (Tr, Bp, Gs, Pf), the machine learning method including:

extracting (S11, S12) a feature amount (Θ, Φ, Ω, Γ) of each of a plurality of vertices ($Lf_1$ to $Lf_4$, $Nd_1$ to $Nd_4$, $Us_1$ to $Us_4$, $Cm_1$ to $Cm_5$, $Sn_1$ to $Sn_5$, $Vx_1$ to $Vx_3$) included in the graph structure (Tr, Bp, Gs, Pf) from the input data (10,10B,10C) to calculate a likelihood that an edge ($Br_1$ to $Br_7$, $Rs_1$ to $Rs_4$, $Eg_1$to $Eg_3$) representing the correlation is connected to the vertex;

determining (S13) the graph structure (Tr, Bp, Gs, Pf) based on a conversion result of a Gumbel-Softmax function for the likelihood;

receiving (S14) the graph structure (Tr, Bp, Gs, Pf) and the feature amount (ΘΦ, Ω, Γ) to generate the output data (20, 20B, 20C); and optimizing (S15) the model (Mc, Md) by back propagation that targets a loss function for minimization, the loss function including an error (Lr) between the output data (20, 20B, 20C) and correct data.

The embodiments disclosed herein are also planned to be implemented in appropriate combination within a range not contradictory. It should be considered that the disclosed embodiments are an example in all respects and not restrictive. The scope of the present invention is defined by not the description above, but the claims, and it is intended that all modifications within the meaning and scope of the claims and their equivalents are included in the present invention.

The invention claimed is:

1. An information processing device that extracts, from input data, a graph structure representing a correlation between elements included in the input data to generate output data from the graph structure, the information processing device comprising a processor configured to perform:

an encoding process to extract a feature amount of each of a plurality of vertices included in the graph structure from the input data to calculate a likelihood that an edge representing the correlation is connected to the vertex;

a sampling process to determine the graph structure based on a conversion result of a Gumbel-Softmax function for the likelihood;

a decoding process to receive the graph structure and the feature amount and generate the output data;

a quality inspection process to calculate quality data which represents a quality of a product based on the graph structure and the feature amount; and a learning process to optimize the decoding process, the encoding process, and the qualify inspection process by back propagation that targets a loss function for minimization, the loss function including an error between the output data and correct data, the loss function further including an error between quality data calculated by the quality inspection process and correct quality data, wherein the input data includes time-series data of detection values of a plurality of sensors included in a manufacturing facility that manufactures a product, wherein the graph structure represents a correlation between the plurality of sensors, wherein the quality inspection process is configured to emphasize a vertex in the graph structure visualized in a display device, the vertex corresponding to a detection value of a sensor contributing to a defect included in the product, among the plurality of sensors, and wherein the defect corresponds to an error between the quality data and reference quality data.

2. The information processing device according to claim 1, wherein the processor is further configured to perform a reconfiguration process to reconfigure the graph structure from the output data, wherein the loss function includes an error between an output from the reconfiguration process and a correct graph structure.

3. The information processing device according to claim 1, wherein the processor is further configured to perform an inference process to receive the graph structure from the sampling process to output an inference result for the input data, wherein the learning process performs unsupervised learning for the decoding process and the encoding process, and performs supervised learning for the inference process.

4. The information processing device according to claim 1, wherein:

the input data includes first data and second data, a modality of the first data is different from a modality of the second data, and the encoding process includes:

a first process that extracts a feature amount of the first data; and a second process that extracts a feature amount of the second data.

5. The information processing device according to claim 1, wherein a modality of the output data is different from a modality of the input data.

6. A machine learning method performed by a processor that executes a machine learning program stored in a storage unit for a model that extracts, from input data, a graph structure representing a correlation between elements included in the input data from the input data to generate output data from the graph structure, the machine learning method comprising:

extracting a feature amount of each of a plurality of vertices included in the graph structure from the input data to calculate a likelihood that an edge representing the correlation is connected to the vertex;

determining the graph structure based on a conversion result of a Gumbel-Softmax function for the likelihood;

receiving the graph structure and the feature amount to generate the output data;

calculating quality data which represents a quality of a product based on the graph structure and the feature amount; and optimizing the model and a quality inspection model by back propagation that targets a loss function for minimization, the loss function including an error between the output data and correct data, the loss function further including an error between quality data calculated by the quality inspection model and correct quality data;

wherein the input data includes time-series data of detection values of a plurality of sensors included in a manufacturing facility that manufactures a product, wherein the graph structure represents a correlation between the plurality of sensors, wherein the machine learning method comprises emphasizing a vertex in the graph structure visualized in a display device, the vertex corresponding to a detection value of a sensor contributing to a defect included in the product, among the plurality of sensors, and wherein the defect corresponds to an error between the quality data and reference quality data.

* * * * *